(12) United States Patent
Cauley, III et al.

(10) Patent No.: US 11,009,150 B2
(45) Date of Patent: May 18, 2021

(54) ROTARY VALVE

(71) Applicant: Talis Biomedical Corporation, Menlo Park, CA (US)

(72) Inventors: Thomas H. Cauley, III, Redwood City, CA (US); John Dixon, Moss Beach, CA (US)

(73) Assignee: Talis Biomedical Corporation, Menlo Park, CA (US)

( * ) Notice: Subject to any disclaimer, the term of this patent is extended or adjusted under 35 U.S.C. 154(b) by 0 days.

(21) Appl. No.: 16/694,887

(22) Filed: Nov. 25, 2019

(65) Prior Publication Data

US 2020/0182379 A1 Jun. 11, 2020

Related U.S. Application Data

(63) Continuation of application No. 15/898,064, filed on Feb. 15, 2018, now Pat. No. 10,527,192.

(51) Int. Cl.
*B01L 3/00* (2006.01)
*F16K 99/00* (2006.01)

(52) U.S. Cl.
CPC .... *F16K 99/0013* (2013.01); *B01L 3/502738* (2013.01); *B01L 3/565* (2013.01); *B01L 3/567* (2013.01); *F16K 99/0028* (2013.01); *B01L 2300/042* (2013.01); *B01L 2300/0816* (2013.01); *B01L 2400/0622* (2013.01); *B01L 2400/0644* (2013.01); *F16K 2099/0084* (2013.01)

(58) Field of Classification Search
None
See application file for complete search history.

(56) References Cited

U.S. PATENT DOCUMENTS

| | | | |
|---|---|---|---|
| 2,598,362 A | 11/1945 | Daniels |
| 2,428,410 A | 10/1947 | Daniels |
| 3,504,799 A | 4/1970 | Ogle |
| 5,639,074 A | 6/1997 | Greenhill et al. |
| 6,250,618 B1 | 6/2001 | Greenhill |
| 6,254,071 B1 | 7/2001 | Greenhill |
| 6,374,684 B1 | 4/2002 | Dority |
| 6,702,256 B2 | 3/2004 | Killeen et al. |
| 6,758,465 B1 | 7/2004 | Greenhill et al. |
| 6,779,557 B2 | 8/2004 | Weiss |
| 6,813,568 B2 | 11/2004 | Powell et al. |
| 6,889,710 B2 | 5/2005 | Wagner |
| 7,143,787 B1 | 12/2006 | Bauerle et al. |
| 7,159,848 B2 | 1/2007 | Brennen |
| 7,377,291 B2 | 5/2008 | Moon et al. |

(Continued)

*Primary Examiner* — Jyoti Nagpaul
(74) *Attorney, Agent, or Firm* — Shay Glenn LLP

(57) ABSTRACT

Rotary valves and methods of using, manufacturing, and storing the same are provided herein. The rotary valve includes a rotor and a stator, biased toward one another to form a fluid tight seal. In some implementations, the rotor comprises an integrated flow channel containing a porous solid support. Frequently, the interface between rotor and stator is made fluid-tight using a gasket. Some implementations of the rotary valve include a displaceable spacer to prevent the gasket from sealing against at least one of the rotor and stator prior to operation, wherein when the spacer is displaced, the gasket seals the rotor and stator together in a fluid-tight manner.

20 Claims, 11 Drawing Sheets

(56) References Cited

U.S. PATENT DOCUMENTS

| | | |
|---|---|---|
| RE40,511 E | 9/2008 | Weiss |
| 7,503,203 B2 | 3/2009 | Gamache et al. |
| 7,871,575 B2 | 1/2011 | Baeuerle et al. |
| 7,998,437 B2 | 8/2011 | Berndt et al. |
| 8,008,080 B2 | 8/2011 | Tokhtuev et al. |
| 8,012,427 B2 | 9/2011 | Bommarito et al. |
| 8,016,264 B2 | 9/2011 | Takemasa et al. |
| 8,017,409 B2 | 9/2011 | Tokhtuev et al. |
| 8,186,381 B2 | 5/2012 | Wilen |
| 8,186,382 B2 | 5/2012 | Wilen |
| 8,191,578 B2 | 6/2012 | Weiss |
| 8,202,492 B2 | 6/2012 | Linder et al. |
| 8,225,817 B2 | 7/2012 | Wilen |
| 8,272,401 B2 | 9/2012 | McLean |
| 8,286,663 B2 | 10/2012 | Kallback et al. |
| 8,622,086 B2 | 1/2014 | Servin |
| 8,656,955 B2 | 2/2014 | Price |
| 8,728,765 B2 | 5/2014 | Ching et al. |
| 8,763,640 B2 | 7/2014 | Kojima et al. |
| 8,770,226 B2 | 7/2014 | Wilen et al. |
| 8,857,792 B2 | 10/2014 | Parrie et al. |
| 8,876,081 B2 | 11/2014 | Tower |
| 8,887,754 B2 | 11/2014 | Dahlke et al. |
| 8,900,828 B2 | 12/2014 | Smith et al. |
| 8,911,688 B2 | 12/2014 | Gransee et al. |
| 8,960,230 B2 | 2/2015 | Weber |
| 9,169,934 B2 | 10/2015 | Bunner et al. |
| 9,194,504 B2 | 11/2015 | Cormier et al. |
| 9,199,238 B2 | 12/2015 | Koltzscher et al. |
| 9,308,530 B2 | 4/2016 | Hanafusa |
| 9,316,321 B2 | 4/2016 | McCarty |
| 9,316,324 B2 | 4/2016 | Berndt |
| 9,383,020 B2 | 7/2016 | Jackson |
| 9,421,545 B2 | 8/2016 | Servin |
| 9,669,409 B2 | 6/2017 | Dority et al. |
| 9,808,802 B2 | 11/2017 | Dothie et al. |
| 10,527,192 B2 | 1/2020 | Cauley et al. |
| 2003/0116203 A1 | 6/2003 | Fleischer |
| 2003/0116206 A1 | 6/2003 | Hartshorne et al. |
| 2005/0244837 A1 | 11/2005 | McMillan |
| 2007/0144594 A1* | 6/2007 | Moon ................ F16K 37/0058 137/625.46 |
| 2015/0020904 A1 | 1/2015 | Gärtner et al. |
| 2015/0184760 A1 | 7/2015 | Moeller et al. |
| 2018/0015467 A1 | 1/2018 | Liang et al. |

* cited by examiner

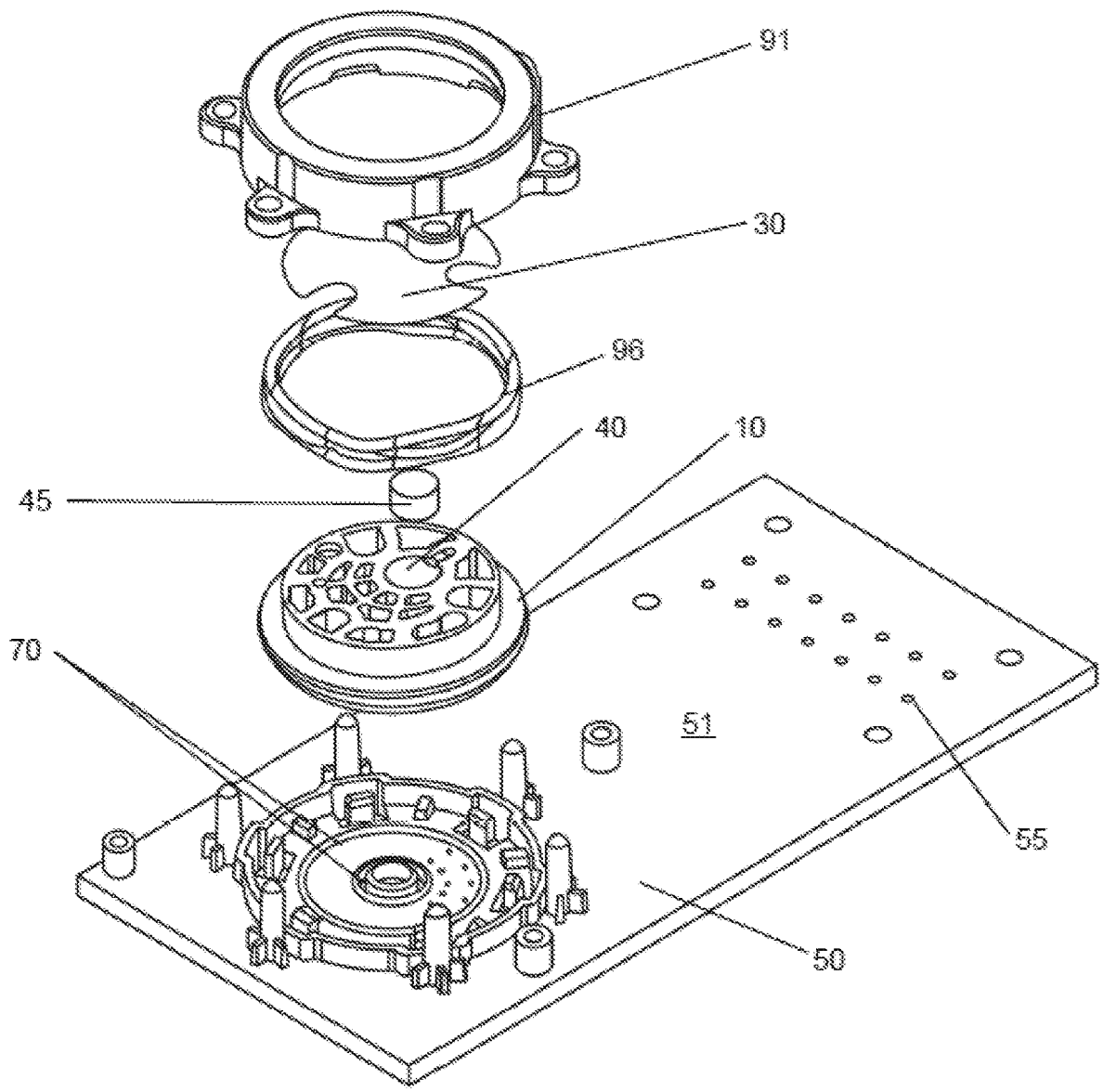
FIG. 1 B1

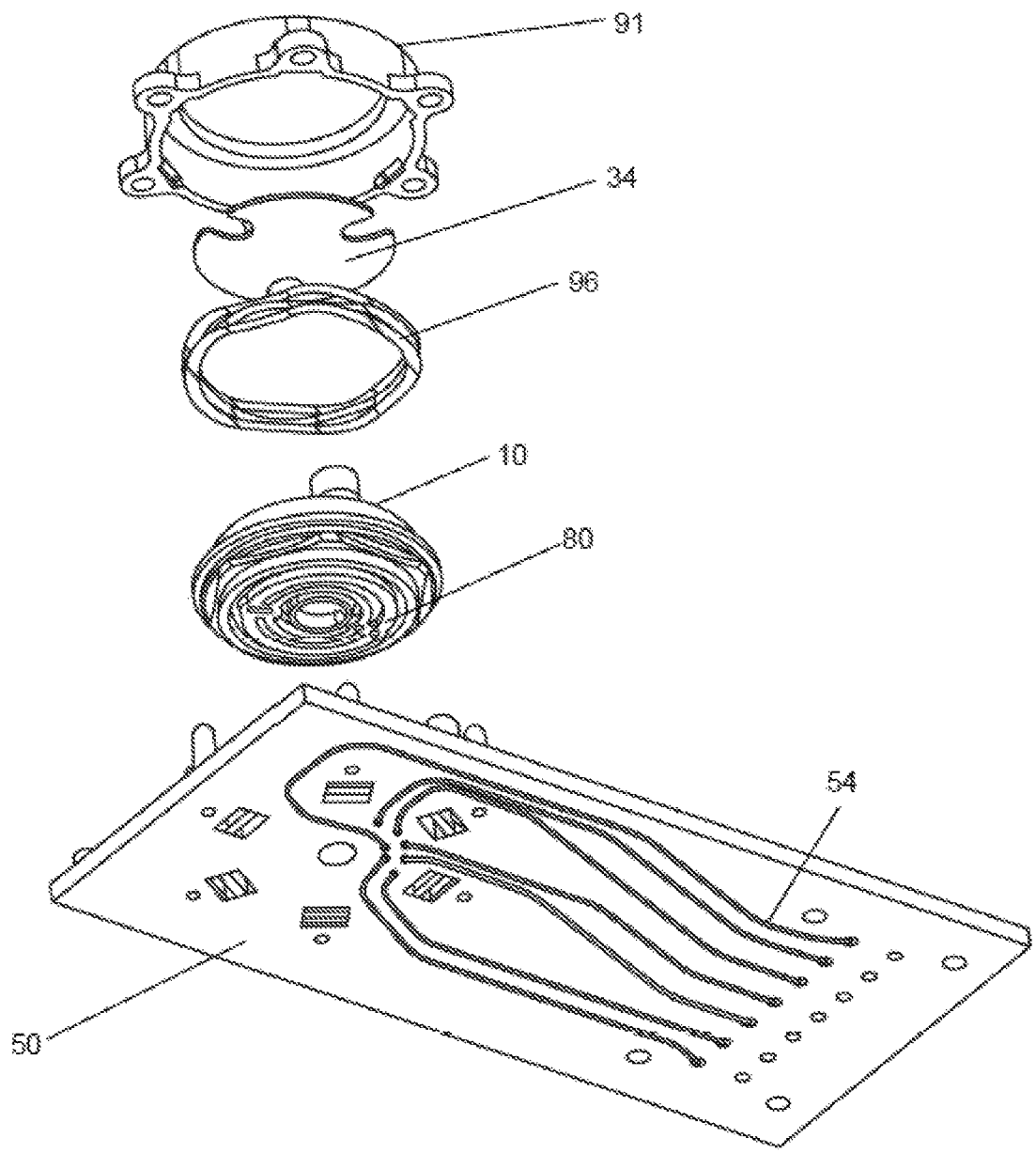
FIG. 1 B2

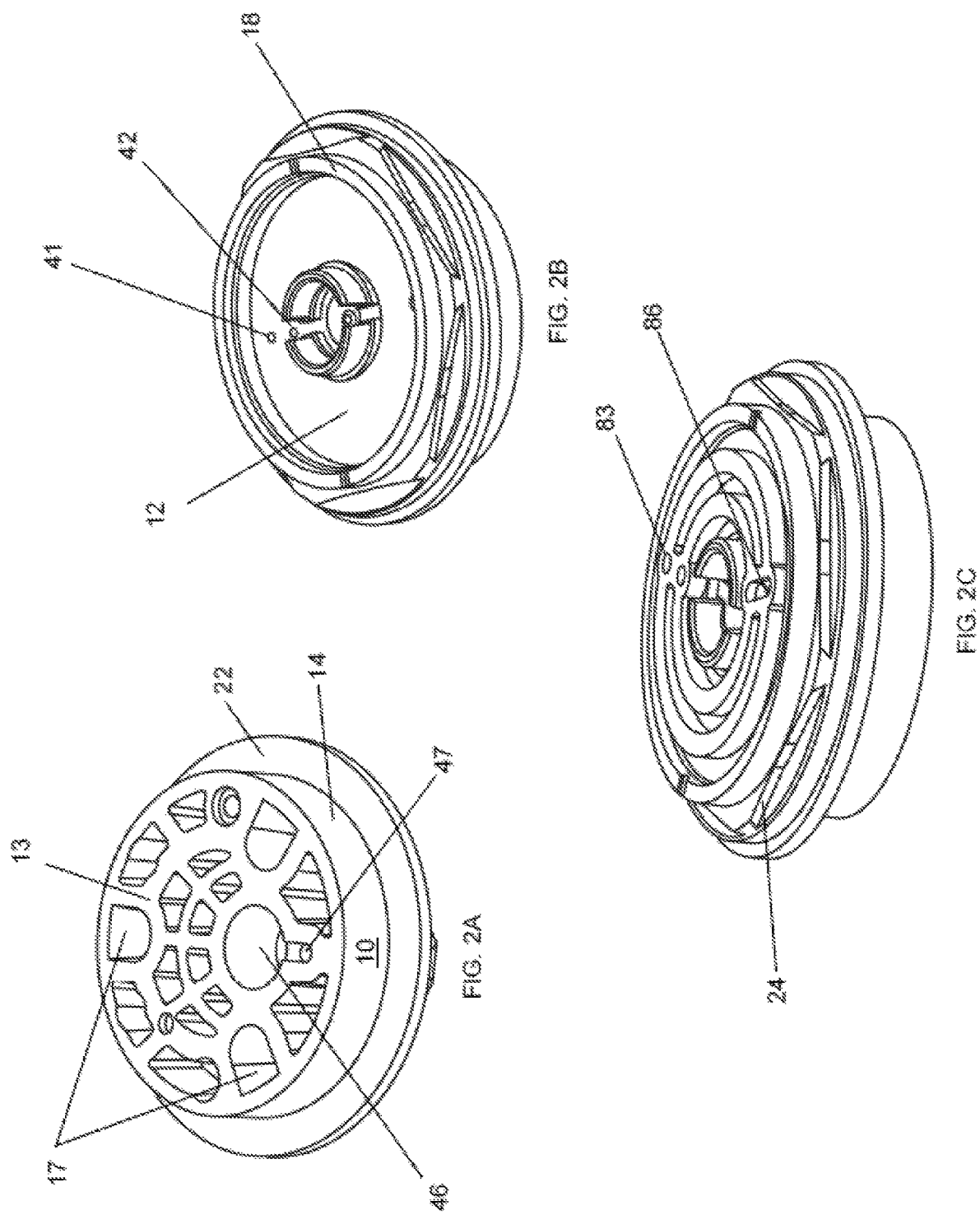

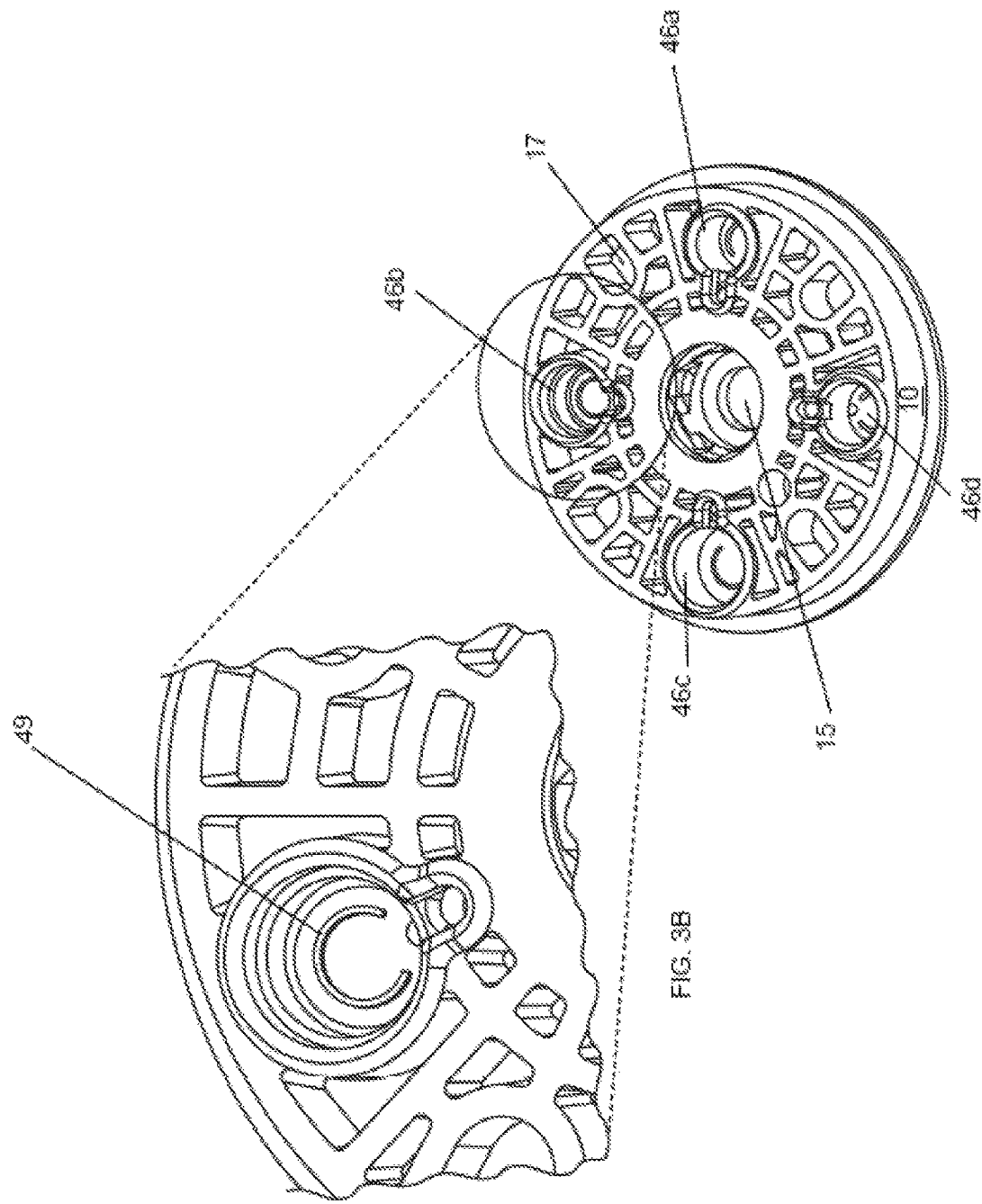

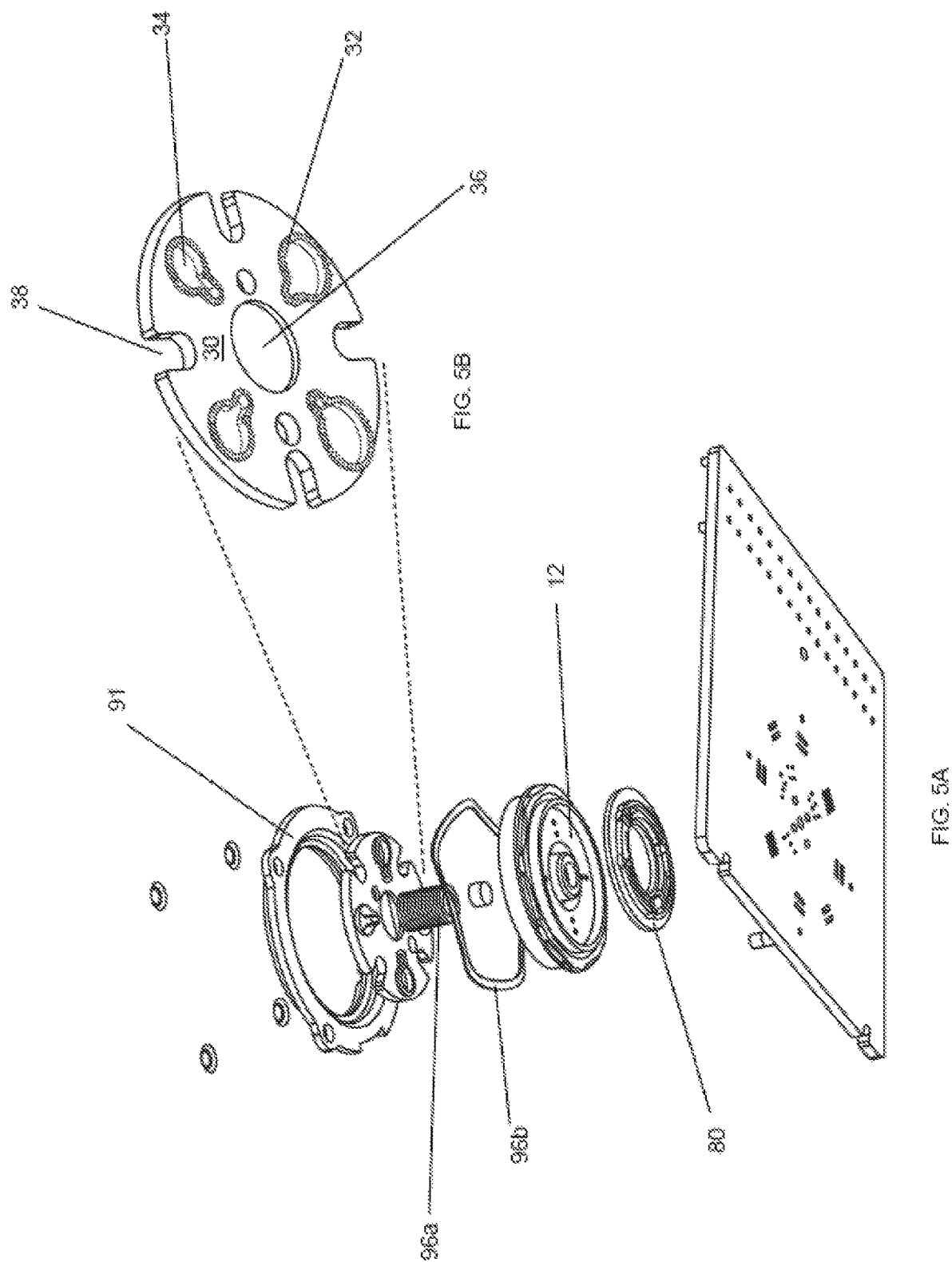

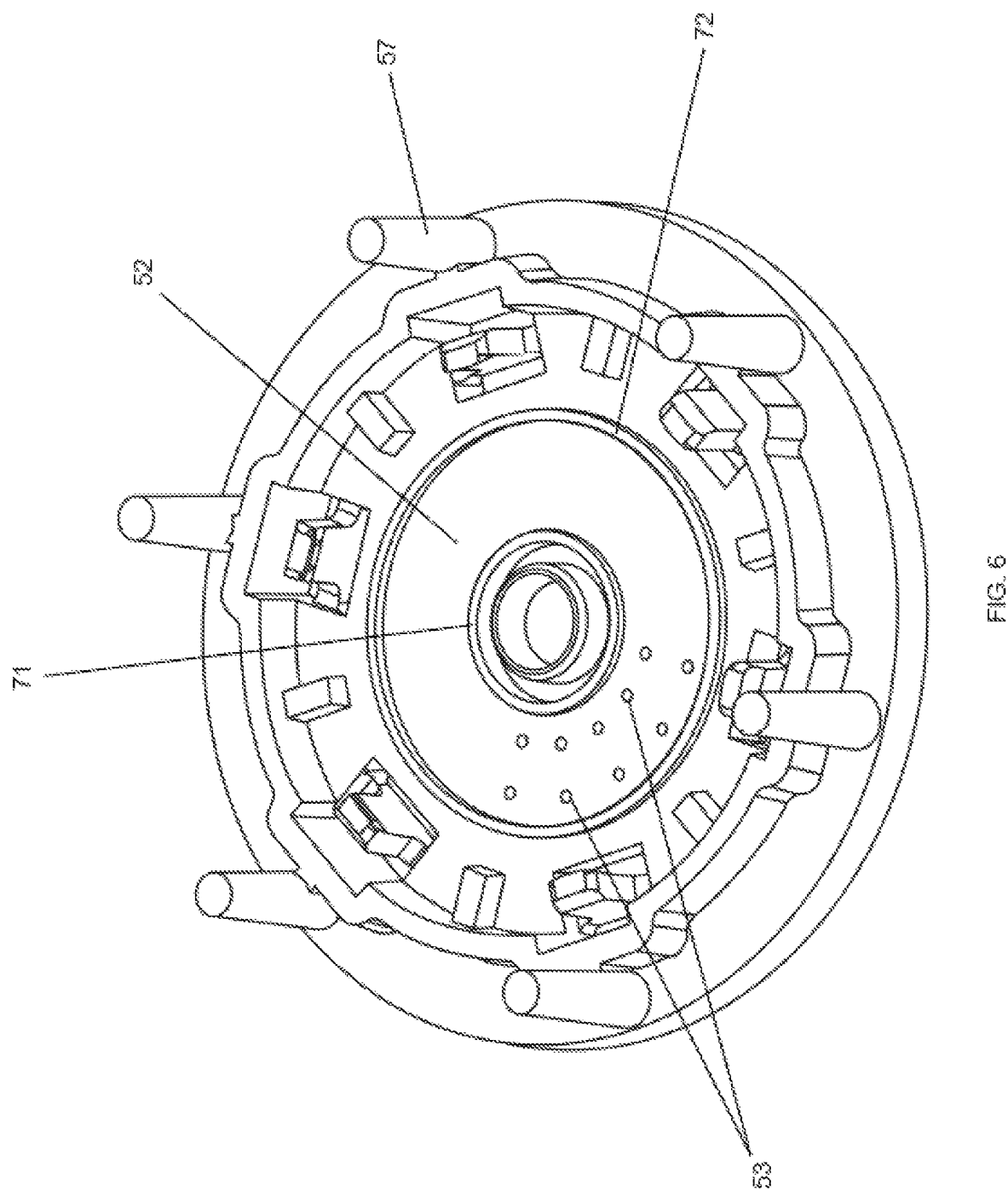

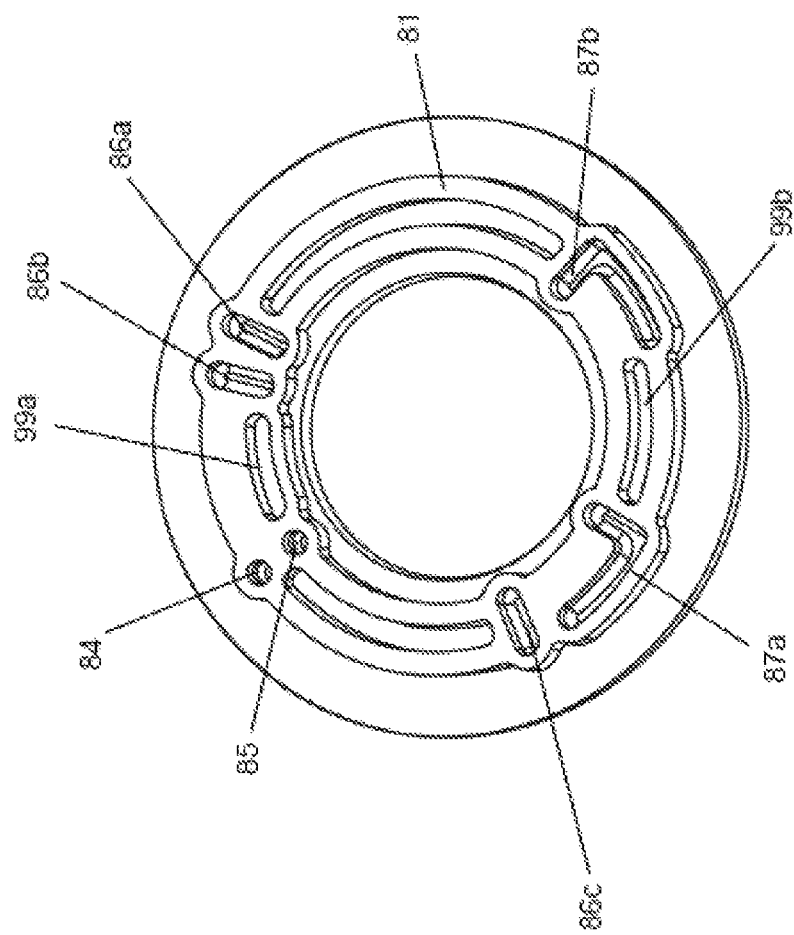
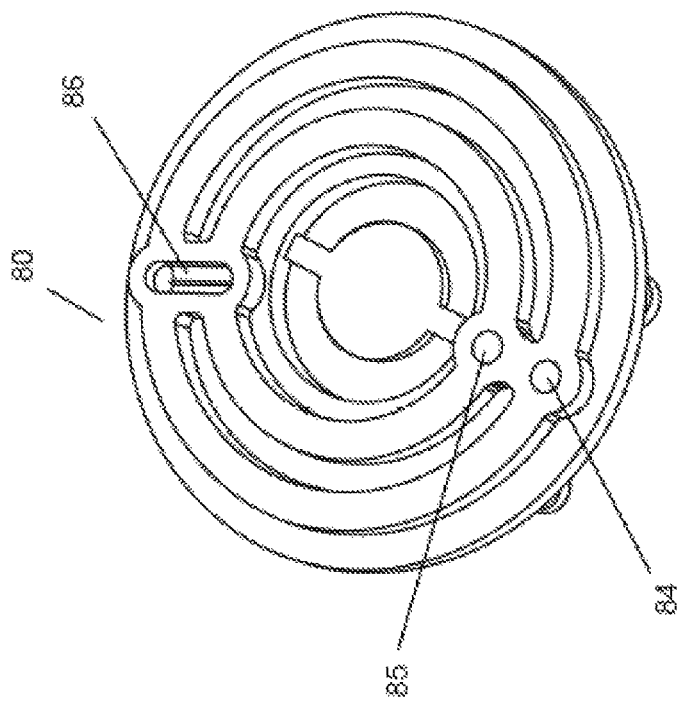
FIG. 7B
FIG. 7A

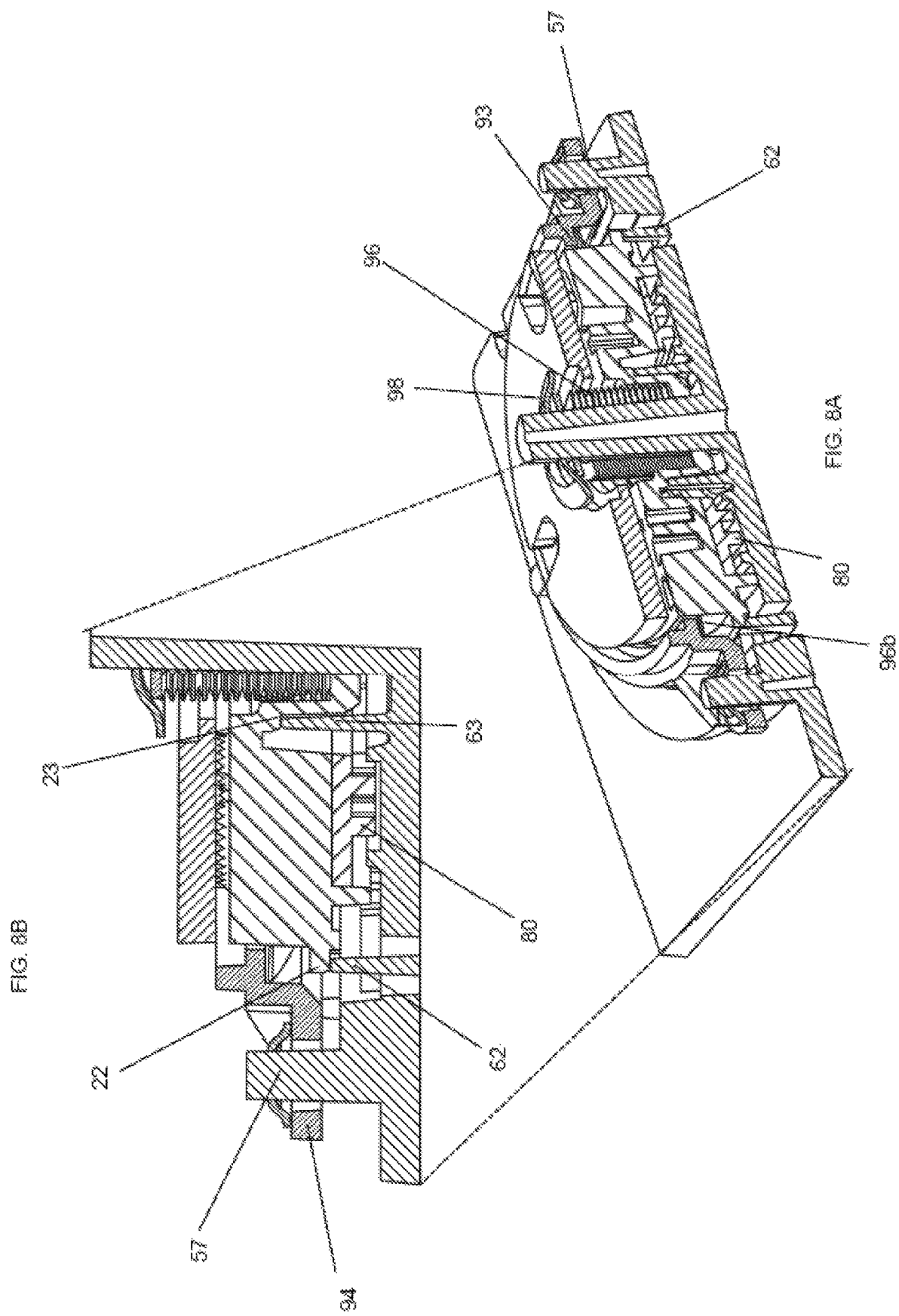

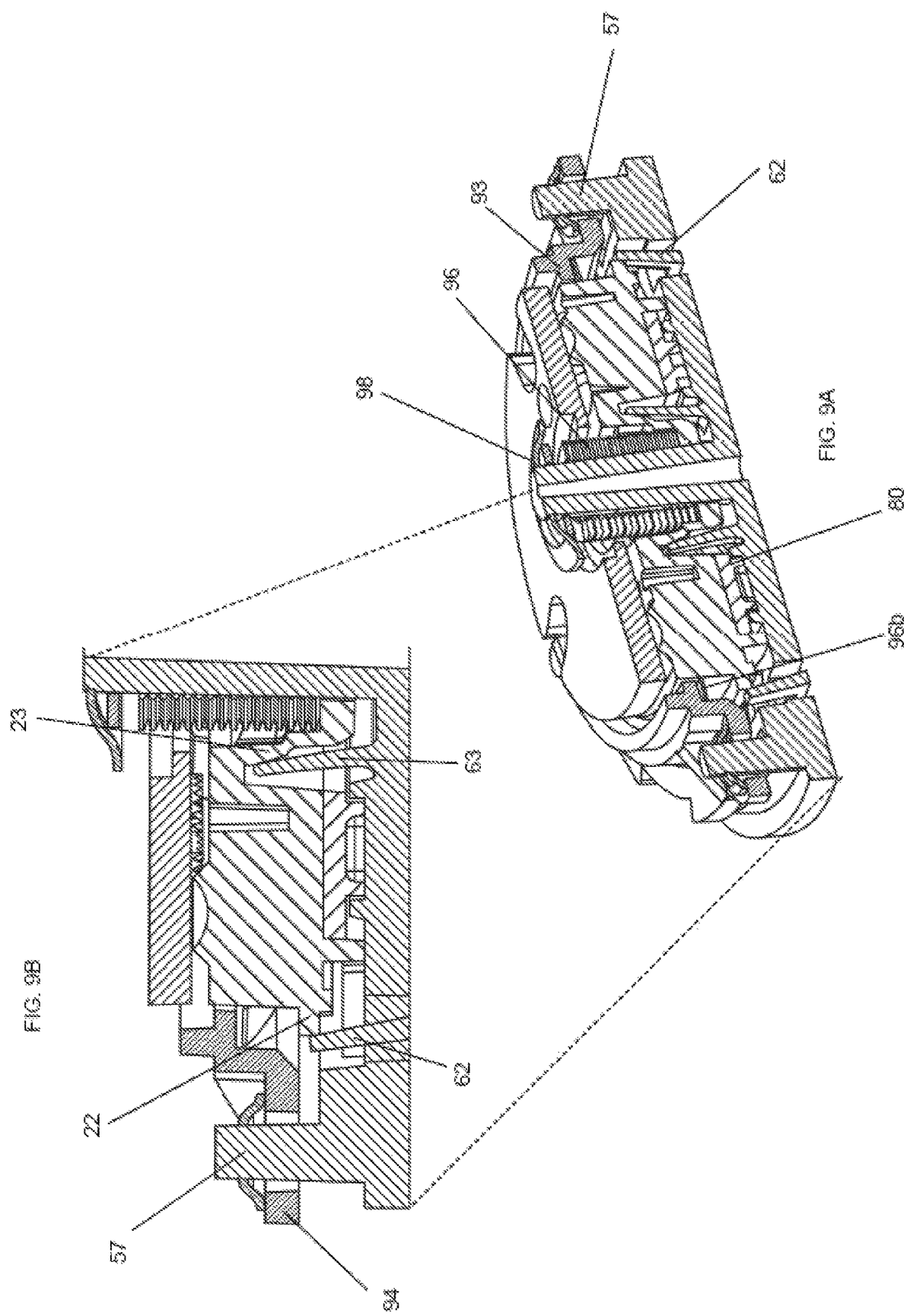

ROTARY VALVE

CROSS REFERENCE TO RELATED APPLICATIONS

This application is a continuation of U.S. patent application Ser. No. 15/898,064, filed Feb. 15, 2018, titled "ROTARY VALVE," now U.S. Patent Application Publication No. 2019/0249799, which is herein incorporated by reference in its entirety.

STATEMENT REGARDING FEDERALLY SPONSORED RESEARCH OR DEVELOPMENT

This invention was made with government support under contract number HR0011-11-2-0006 awarded by the Department of Defense (DARPA). The government has certain rights in the invention.

TECHNICAL FIELD

The present invention relates to the field of rotary valves used, for example, to direct fluid flows in microfluidic and diagnostic devices.

BACKGROUND

Lab-on-a-valve or other diagnostic systems that use microfluidic components to carry out real-time analysis of biological samples have great potential for applications in a broad range of scientific research and diagnostic applications. Key to the function of such systems are methods for directing fluids to correct segments of a device, particularly a microfluidic device.

The devices and methods described herein provide effective ways of transporting fluids and/or isolating one or more analyte therefrom. Such devices can be utilized for mixing or metering fluids to perform, for example, chemical or biochemical purification, synthesis and/or analysis. The subject devices can be employed to evaluate a sample to determine whether a particular analyte, such as an organism is present in the sample. Fluidic devices can be employed to provide a positive or negative assay result. Such devices can also be employed, for example, to determine a concentration of the analyte in the sample or other characteristics of the analyte.

Fluidic devices are also specifically applied in biological assays. Devices can be employed in the capture of analytes from solution, such as by filtration. Such capture can include concentrating analytes by passing the analytes in solution over a porous solid support, selective matrix or membrane. The selective element in turn restricts the movement of the analytes away from the selective element without restricting movement of the remaining solution. One practical application of analyte capture is the concentration of nucleic acids by filtration into volumes that are amenable to amplification reactions. In such a circumstance, analytes having even a small initial concentration can be captured from a solution and thereby concentrated. The described single axis actuation valve device reduces the cost and complexity of the instrument compared to common existing valves. Further, the integration of zero, one, or multiple flow channels and/or porous solid supports in the rotor eases the requirements on fluidic layout and simplifies the design of the overall device compared to common existing valves.

Additionally, fluidic devices having moving parts may suffer structurally from storage. For example, a flexible material such as a gasket that is compressed for extended periods of time during storage or shipping may become deformed and/or can experience a loss in elasticity. Further extended storage under compression can lead to adhesion of the flexible material to the compressing surface. Such circumstances can negatively affect the operability of a valve, for example, to contain, direct and/or transport fluids therethrough. Adhesion of the gasket can impede movement of the valve requiring significant force to actuate the valve or, in some cases, seize and render the valve inoperable. The subject devices and methods including a storage configuration in which a displaceable spacer holds the rotor away from the stator until the device is activated. As such, a storage configuration avoids problems with compression set and valve degradation from storage under pressure. Accordingly, the subject valve eases the requirements on the gasket elastomer sealing surface and thereby enables a higher pressure rating, and longer operating and storage lifetimes than common existing valves.

SUMMARY

Rotary valves and methods of using, manufacturing, and storing the devices are provided herein. The valve devices can include a rotor connected to a stator and including a rotor valving face and a flow channel containing a porous solid support. Versions of the valve devices include a displaceable spacer for preventing the gasket from sealing against at least one of the rotor and stator, wherein when the spacer is displaced, the gasket seals the rotor and stator together in a fluid-tight manner.

In one aspect, the invention provides a rotary valve 00 comprising (a) a stator 50 comprising a stator face 52 and a plurality of passages 54, each passage comprising a port 53 at the stator face; (b) a rotor 10 operably connected to the stator and comprising a rotational axis 16, a rotor valving face 12, and a flow channel 40 having an inlet 41 and an outlet 42 at the rotor valving face, wherein the flow channel comprises a porous solid support 45; and (c) a retention element 90 biasing the stator and the rotor together at a rotor-stator interface 02 to form a fluid tight seal.

In a preferred implementation, the cross-section of the flow channel 40 is not concentric with the rotational axis 16. In certain implementations, the rotor valving face 12 comprises a gasket 80 interposed at the rotor-stator interface 02. Such a gasket 80 can comprise an aperture 83 therethrough, and the gasket can be laterally constrained by an arcing rail 70 on the stator. Alternately, the stator face 52 can comprise a gasket 80 interposed at the rotor-stator interface 02.

In some implementations, the rotor valving face comprises a fluidic connector 86, wherein in a first rotor position a first port 53a of the stator is fluidically connected to a second port 53b of the stator via the fluidic connector 86. The rotary valve can further comprise a second rotor position, in which a third port 53c is fluidically connected to a fourth port 53d via the fluidic connector 86. The stator can comprise a plurality of proximal ports at a first radial distance from the rotational axis and a plurality of distal ports at a second, greater radial distance.

In some implementations, the rotor valving face comprises a fluidic selector 87 having an arcing portion having center line arcing equidistant from the rotational axis and a radial portion extending from the arcing portion radially toward the rotational axis or away from the rotational axis. In such implementations, in a first rotor position, a first port 53a at a first radial distance from the rotational axis 16 can be fluidically connected to a second port 53b at a second radial distance from the rotational axis via the fluidic selector 87, and in a second rotor position, the first port fluidically connected to a third port 53c at the second radial distance from the rotational axis via the fluidic selector, and wherein the first port remains fluidically connected with the fluidic selector while the rotor is rotated between the first rotor position and the second rotor position.

In some implementations, the rotor comprises a plurality of flow channels 40, each flow channel comprising an inlet 41, an outlet 42, and a porous solid support 45. In certain implementations, the rotor comprises a main body 11 and a cap 30 operably connected to the main body, and wherein one wall of the flow channel 40 is defined by the cap. The rotor comprises an outer face 13 opposite the rotor valving face, wherein the outer face can comprise an opening for engaging a spline.

In some implementations, the rotary valve further comprises a gasket 80 between the stator face 52 and the rotor valving face 12, and wherein the stator comprises a displaceable spacer 60 for preventing the gasket from sealing against at least one of the rotor 10 and stator 50, and wherein, when the spacer is displaced the gasket seals the rotor and stator together in a fluid-tight manner. The retention element 90 can comprise a retention ring 91 and a biasing element 96. In a preferred implementation, the retention ring 91 is fixedly coupled to the stator 50 and the biasing element 96 is a spring biasing the rotor and stator together.

Another aspect of the invention provides a rotor comprising (a) a rotor valving face 12 perpendicular to a rotational axis 16 of the rotor, the rotor valving face configured to contact a planar stator face in a fluid tight manner; and (b) a flow channel 40 configured to contain a porous solid support 45, wherein the flow channel has an inlet 41 and an outlet 42 at the rotor valving face. The flow channel 40 can comprise a porous solid support chamber 46 containing a solid support 45. In certain implementations, the rotor valving face comprises a fluidic connector 86. In some implementations, the rotor valving face comprises a fluidic selector 87 having an arcing portion having center line arcing equidistant from the rotational axis and a radial portion extending from the arcing portion radially toward the rotational axis or away from the rotational axis. The rotor can comprise a plurality of flow channels 40, each flow channel comprising a porous solid support 45. The rotor also can further comprise a gasket 80 operably connected to the rotor valving face 12.

Another aspect of the invention provides rotary valves comprising (a) a rotor 10 comprising a rotor valving face 12, an outer face 13 opposite the rotor valving face, and a rotational axis 16; (b) a stator 50; (c) a gasket 80 interposed between the stator and the rotor valving face; and (d) a displaceable spacer 60 for preventing the gasket from sealing against at least one of the rotor and stator, wherein, when the spacer is displaced the gasket seals the rotor and stator together in a fluid-tight manner. The rotary valve can further comprise a retention element 90 biasing the rotor and stator towards one another. In some implementations, the retention element 90 comprises a retention ring 91 and a biasing element 96. In some implementations, the retention ring 91 is fixedly coupled to the stator and the biasing element 96 is a spring. In certain implementations, the rotor 10 comprises at least one lip 21 and the displaceable spacer 60 comprises a plurality of tabs 61 displaceable from a storage configuration to an operational configuration, wherein each of the tabs 61 contact the at least one lip 21 and thereby prevent the gasket from sealing the rotor and stator in the storage configuration, and disengage with the at least one lip when the tabs are displaced from the storage configuration to the operational configuration. The at least one lip 21 can be an interior lip 23 and the rotor further comprises a displacer slot 28 adjacent to the interior lip, wherein the displacer slot accommodates the interior tabs 63 when displaced to the operational configuration. In some implementations, the rotor 10 comprises a curved outer wall 14 and the at least one lip 21 is a peripheral lip 22 located on the outer wall. In a preferred implementation, the rotor comprises one or more cams 24 which displace the plurality of tabs 60 from the storage configuration to the operational configuration and thereby disengages the plurality of tabs 61 from the at least one lip 21 when the rotor is rotated.

Another aspect of the invention provides microfluidic networks comprising (a) a valve as described herein; and (b) a plurality of microfluidic conduits 55 each fluidically connected to one of the ports 53.

Yet another aspect of the invention provides methods of purifying an analyte, the method comprising (a) providing a rotary valve as described herein; and (b) flowing a sample comprising analyte through the flow channel and retaining at least a portion of the analyte on the porous solid support to produce a bound analyte portion and a depleted sample portion. In some implementations, flowing the sample through the flow channel comprises placing the rotor at a first rotational position, thereby fluidically connecting the first port, the flow channel, and the second port. The sample can be flowed into the flow channel via the first port and the depleted sample portion exits the flow channel via the second port. A preferred implementation of the method comprises rotating the rotor to a second rotational position, thereby fluidically connecting the third port, the flow channel and the fourth port, and then flowing eluent into the flow channel via the third port and thereby releasing at least a portion of the analyte from the porous solid support to produce an analyte sample, which exits the flow channel via the fourth port.

Another aspect of the invention provides methods of producing a rotary valve, the method comprising (a) forming a stator comprising a stator face from a stator body material; (b) forming within the stator a plurality of passages, each passage comprising a port at the stator face; (c) forming a rotor comprising a rotor valving face from a rotor body material; (d) forming within the rotor a flow channel comprising an inlet and an outlet at the rotor valving face; and (e) inserting a porous solid support into the flow channel.

One aspect of the invention provides methods of storing a rotary valve, the method comprising (a) placing the valve according as described herein into a storage container; and (b) storing the valve for a period of time. In some implementations, storing the valve comprises maintaining the valve in a storage position wherein the gasket is spaced apart from at least one of the rotor and the stator. Preferably, the period of time is 30 days or more, and more preferably the period of time is 90 days or more.

DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead placed upon illustrating the principles of various embodiments of the invention.

FIGS. 1A, 1 B 1, and 1 B2 provide several views of one rotary valve according to the invention described herein. FIG. 1A provides a partial cut-away view of a rotary valve. FIG. 1B FIGS. 1 B1 and 1 B2 provide an exploded illustration of the same valve from two angles. FIG. 1 B1 is a top angle. FIG. 1 B2 is a bottom angle.

FIGS. 2A, 2B, and 2C provide several perspective views of a rotor. FIG. 2A provides a perspective view of a rotor main body from the outer face side. FIG. 2B provides a view of the same rotor main body from valving face side. FIG. 2C provides a perspective view of the rotor main body with an attached gasket from the valving face side.

FIGS. 3A and 3B provide a perspective drawing of a rotor comprising a plurality of flow channels. The inset providing a magnified view of a single solid support chamber within one of the flow channels (see FIG. 3B).

FIGS. 5A and 5B provide an exploded illustration of an embodiment of a valve having a rotor with a central column. A magnified view of the rotor cap is also provided (see FIG. 5B).

FIG. 6 provides a perspective view of a stator of a rotary valve comprising arcing rails and several ports.

FIGS. 7A and 7B provide perspective views of embodiments of a gasket slidably engaging a stator.

FIGS. 8A and 8B provide a perspective cross section view and a partial section view, respectively, of a valve in a storage position.

FIGS. 9A and 9B provide a perspective cross section view and a partial section view, respectively, of a valve in an operational position.

DETAILED DESCRIPTION

Figure 1A:
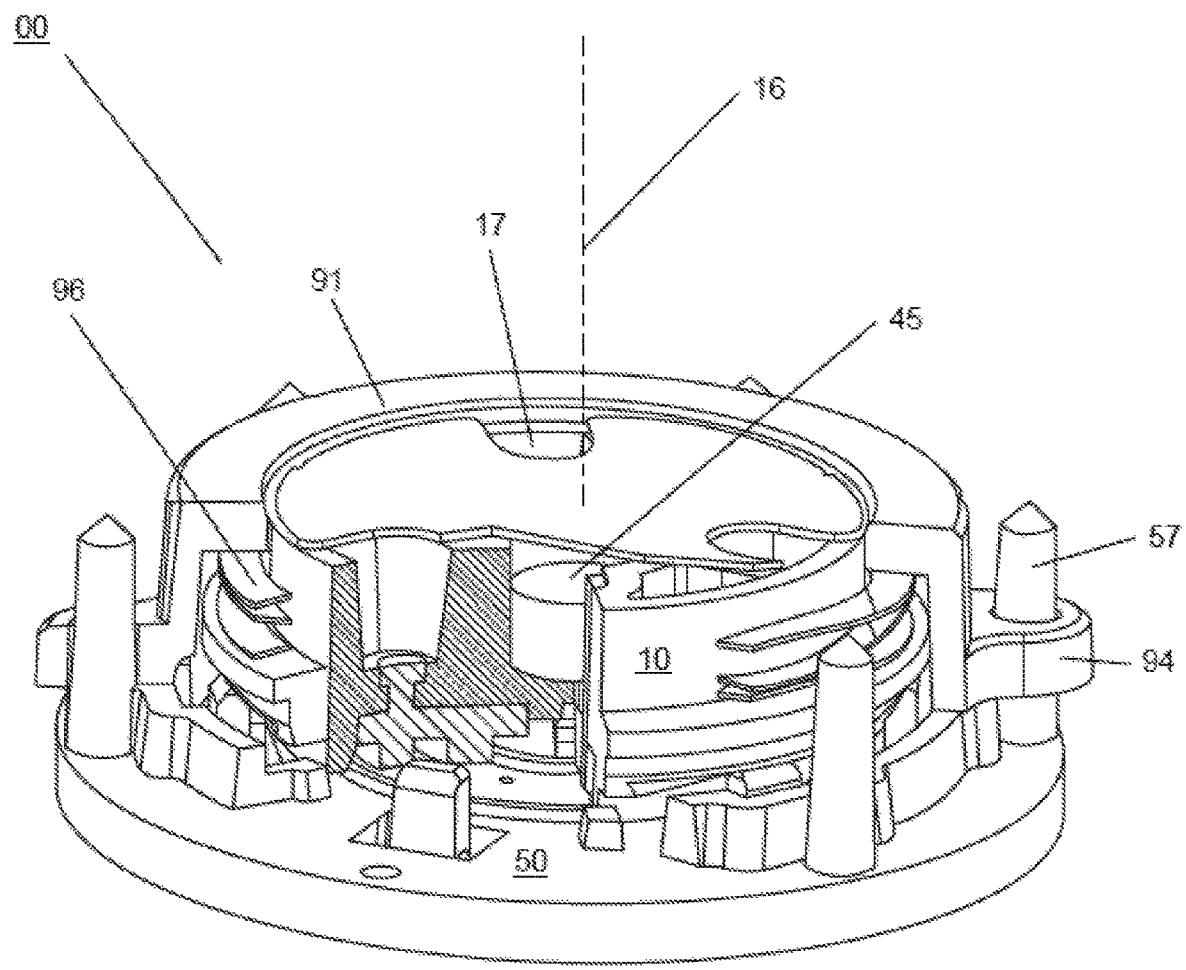

The details of various embodiments of the invention are set forth in the description below. Other features, objects, and advantages of the invention will be apparent from the description and the drawings, and from the claims.

Rotary valves and methods of using, manufacturing, and storing the same are provided herein. The rotary valve includes a rotor and a stator, biased toward one another to form a fluid tight seal. In some implementations, the rotor comprises an integrated flow channel containing a porous solid support. Frequently, the fluid-tight interface between rotor and stator is strengthened by a gasket. Some implementations of the rotary valve include a displaceable spacer to prevent the gasket from sealing against at least one of the rotor and stator prior to operation, wherein when the spacer is displaced, the gasket seals the rotor and stator together in a fluid-tight manner.

Before the present invention is described in greater detail, it is to be understood that this invention is not limited to particular embodiments described and, as such can, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention.

Certain measurements or ranges may be presented herein with numerical values preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number can be a number which, in the context in which it is presented, provides the substantial equivalent of the specifically recited number.

Disclosed is a flexible, robust, valve for micro-fluidic or meso-fluidic applications. This valve is designed so that it's "fluidic programming" can easily be changed. This valve also includes the ability to have filtration of solid phase extraction elements built into the valve's rotor; this eases the design and layout requirements associated with fluidic circuit design. Further, the valve includes an optional shipping position which avoids the problems with compression set of the polymers in the valve surface.

Rotary Valve

Rotary valves, useful for moving, measuring, processing, concentrating and/or mixing one or more fluids or components thereof are provided herein. The rotary valves include at least one rotatable valve component, a rotor, which can be rotated with respect a fixed component, a stator. The term stator indicates the frame of reference for assessing movement within the rotor system. While the stator remains static and the rotor moves in the valve frame of reference, the stator may move relative to a larger piece of equipment or relative to the world as a whole.

In one aspect, the invention provides rotary valves comprising an integrated flow channel that can hold a porous solid support for filtering, binding and/or purifying analytes within a fluid stream. In one implementation, the rotary valve comprises a stator 50 comprising a stator face 52 and a plurality of passages 54, each passage comprising a port 53 at the stator face; a rotor 10 operably connected to the stator and comprising a rotational axis 16, a rotor valving face 12, and a flow channel 40 having an inlet 41 and an outlet 42 at the rotor valving face, wherein the flow channel comprises a porous solid support 45; and a retention element 90 biasing the stator and the rotor together at a rotor-stator interface to form a fluid tight seal.

Within a functioning rotary valve, the rotor is operably coupled to the stator through the action of a biasing element. By "operably connected," and "operably coupled," as used herein, is meant connected in a specific way that allows the disclosed devices to operate and/or methods to be carried out effectively in the manner described herein. For example, operably coupling can include removably coupling or fixedly coupling two or more aspects. As such, aspects that are operably connected can be fixedly connected to one another and/or slidably connected to one another such that they can slide along at least one surface of one another when the device is operated. Aspects that are operably connected can also be rotatably coupled so that one aspect, e.g., a rotor, rotates with respect to another aspect, e.g., a stator. Operable coupling can also include fluidically and/or electrically and/or mateably and/or adhesively coupling two or more components. Also, by "removably coupled," as used herein, is meant coupled, e.g., physically and/or fluidically and/or electrically coupled, in a manner wherein the two or more coupled components can be un-coupled and then re-coupled repeatedly.

The term "fluidic communication," as used herein, refers to any duct, channel, tube, pipe, or pathway through which a substance, such as a liquid, gas, or solid may pass substantially unrestricted when the pathway is open. When the pathway is closed, the substance is substantially restricted from passing through.

FIGS. 1A, 1 B1 and 1 B2 illustrate a rotary valve of the present invention, comprising a rotor 10, a stator 50 and a biasing element 96 to maintain the rotor and stator in fluid tight contact. The rotor and stator each comprises structures for handling and redirecting fluid streams. FIG. 1A provides a partial cutaway view in which a flow channel is partially exposed, revealing a solid support chamber 46 and the porous solid support 45 contained therein. FIGS. 1B1 and 1 B2 illustrate the rotary valve in an exploded view, in which a flow channel 40 is exposed on the outer face (to be enclosed by rotor cap 30), and an inlet 41 and outlet 42 are visible at the valving face. The rotary valve of FIG. 1 B2 includes a gasket 80 at the rotor valving face to enhance the seal between rotor and stator.

Rotor

In one aspect, the rotary valves comprise a rotor with an integrated flow channel holding a solid support for purification, extraction and or concentration of analytes. FIGS. 2A, 2B, 2C, 3A and 3B illustrate typical rotors useful in the rotary valves described herein. FIGS. 2A, 2B, and 2C illustrate a rotor comprising a single flow channel. The solid support chamber 46 is most clearly visible in FIG. 2A. FIG. 2B provides a view of the rotor from the rotor valving face 12, where the inlet 41 and outlet 42 of the flow channel can be seen. FIG. 2C illustrates a rotor comprising a gasket 80 at the valving face. Alternatively, as illustrated in FIGS. 3A and 3B, the rotor can comprise a plurality of flow channels. The rotor of FIG. 3A comprising four flow channels (46a-46d) that can vary from one another in size.

The rotor is configured to rotate about a rotational axis 16. For example, a rotor can rotate about a rotational axis with respect to the stator. Preferably, the rotor is symmetrical or substantially symmetrical centered upon the rotation axis. As used herein, "substantially" means to a great or significant extent, such as almost fully or almost entirely. In various aspects, a rotor is cylindrical or substantially cylindrical. While the main body of the rotor preferably is symmetric about the rotational axis, features such as displaceable spacer interfaces, propulsion engagement openings and fluid handling elements need not be symmetrically or substantially symmetrically placed relative to the rotational axis.

The rotor usable in the devices and methods described herein typically include a first face, e.g., a valving face 12, and a second face, e.g., outer face 13, opposite the first face. The valving face and/or outer face can each be planar or have a planar portion. In such circumstances, the rotational axis of the rotor is perpendicular or substantially perpendicular to the valving face and/or the outer face. Also, in a cylindrical rotor, a rotational axis can be defined by and/or be a portion of the rotor located equidistant or substantially equidistant from all points on an outermost radial edge of the rotor or on an outermost radial edge of the rotor and/or outer face. The rotor valve face 12 optionally comprises a gasket 80. The valving face typically also will comprise one or more fluid handling features, such as an inlet and/or outlet to a flow channel, a fluidic connector or a fluidic selector. In the event that the rotor valving face comprises a gasket, the fluid handling features typically are comprised in the gasket.

In some embodiments, the rotor optionally comprises a central opening 15 for receiving one or more portions of a stator, such as a central stator protrusion around which the rotor can rotate. The central opening of the rotor can also be configured to accommodate a biasing element and/or one or more displaceable spacers.

A rotor, e.g., a cylindrical rotor, has dimensions including a diameter, such as a cross-sectional diameter, which can range from 3 mm to 100 mm, 5 mm to 75 mm, or 10 mm to 50 mm. Such a diameter can also range from 3 mm to 50 mm, 5 mm to 40 mm, or 10 mm to 30 mm.

The rotor is configured to be rotated with a rotation propulsion element, such as a spline which is operably couplable with the rotor. In some aspects, the outer face of the rotor includes an opening defining an edge of a recess, a propulsion engagement opening 17. Operably coupling the rotor and the spline includes engaging the opening with a spline. Such engagement includes inserting at least a portion, e.g., protrusion, of the spline into the opening such that moving the protrusion in a rotational motion also exerts force on the rotor so that the rotor is rotated about the rotational axis. The portion of the spline can be inserted into the opening in a direction toward the stator and/or parallel with the rotational axis of the rotor. Also, in various embodiments, the rotor includes a propulsion protrusion and the rotation propulsion element includes an opening, such as an opening defining an edge of a recess, therein for receiving the rotor protrusion and thereby engaging the rotor with the propulsion element.

In some implementations, including the valve shown in FIGS. 2A and 3, the rotor 10 includes a plurality, e.g., two, three, four or more, propulsion engagement openings 17 for engaging a propulsion element. Such openings can be configured to receive a portion of a rotation propulsion element, such as a manual and/or automatic and/or electronic propulsion element, such as a spline therein, so that the propulsion element can thereafter exert force on the rotor to rotate the rotor. Typically, the propulsion engagement openings are arranged concentrically about the rotational axis of the rotor. In other implementations, the rotor comprises a single propulsion engagement opening that typically, but not necessarily, is coincident with the rotations axis. Such a centrally located propulsion engagement opening preferable is non-circular to permit an interaction with the propulsion element sufficient to generate the torque required to rotate the rotor relative to the stator.

In some versions, the subject valves include a plurality of propulsion projections, such as projections forming a series of teeth protruding from a rotor, for example, an outermost peripheral wall or edge of a rotor. Such projections can be configured to operably engage with a series of receptacles for the teeth on a rotation propulsion element for rotation of the rotor. In various embodiments, the configuration is reversed and the rotor includes a series of receptacles for projections, such as teeth on a rotation propulsion element. As such, in some versions, a rotor portion forms a gear that interlocks with a propulsion element, or a portion thereof and the gear interaction drives rotation of the rotor.

Figure 4:
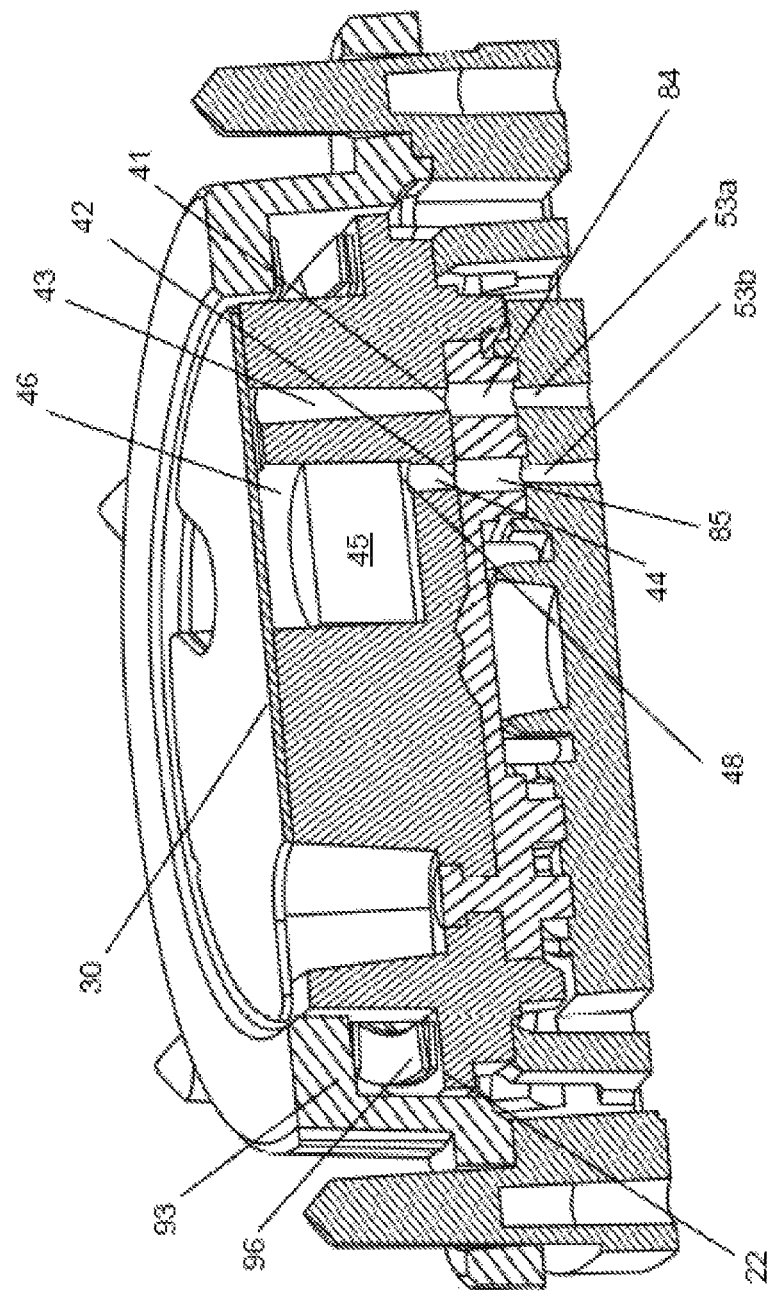
FIG. 4 provides a cross-sectional perspective view of a valve illustrating an interface between a rotor and a stator, according to an embodiment of the invention.

In various embodiments, a rotor includes one or more flow channels, which are configured for flow of one or more fluids, e.g., sample or sample-containing fluids, therethrough. As illustrated in FIG. 4, each flow channel comprises an inlet 41, an outlet 42 at the rotor valving face, and a solid support chamber 46. In many implementations, the flow channel further comprises a first conduit 43, which bridges from the inlet to the solid support chamber. Such implementations may also comprise a second conduit 44, which bridges from the solid support chamber to the outlet. The first and second conduits may have the same or different dimensions, e.g. length, volume or cross-sectional area. The cross-section of the first and second conduits can be uniform or can vary along the length of the conduit. In some implementations, one conduit extends the full thickness, or nearly the full thickness, of the rotor, i.e. from the valving face to the outer face.

As an integral part of the rotor, a flow channel is configured for rotational motion, rotating with the other portions of the rotor with respect to other valve aspects, such as a stator. In a preferred implementation, the flow channel is not concentric with the rotational axis of the rotor. As illustrated in FIG. 4, a flow channel can include one or more inlets 41 and one or more outlets 42 and provide fluidic communication between the inlet and the outlet. In a preferred implementation, each flow channel will comprise a single inlet and a single outlet. The inlet and outlet typically, but not necessarily, will adopt the same form as a cross-section of the flow channel immediately adjacent to that inlet or outlet. The inlet and/or outlet can be circular, rectangular or any other appropriate shape consistent with forming fluid-tight fluidic connections within the valve interface.

In many implementations, the subject devices are disposable and/or are intended for a single-use whereas other valves are not and are intended and used many times. Furthermore, the subject devices can support much more complex circuits in less space than existing valve designs. In addition, the integration of the porous solid support into the valve rotor improves the fluidic layout associated with use of valve.

In various embodiments, the flow channel includes a porous solid support chamber in which a porous solid support is retained. The porous solid support chamber can be cylindrical or can adopt any other shape to accommodate any configuration of the porous solid supports provided herein. In addition to a porous solid support, a porous solid support chamber can also include a supplemental volume for containing a fluid flowed through the chamber before the fluid is flowed through the porous solid support. See, e.g., the head space in the chamber 46 above the porous solid support 45 in FIG. 4. The supplemental volume can have a volume equal to, smaller than or larger than the volume of the porous solid support. The flow channel and solid support chamber can be configured for fluid flow through the chamber substantially parallel to the rotational axis, e.g. as in FIG. 4. Alternatively, the flow channel and solid support chamber can be configured such that the flow of fluid through the chamber is parallel to a rotor valving face. While the volume of the solid support chamber predominantly is contained within the main body of rotor, one or more walls of the solid support chamber can be formed by a separate element, such as a rotor cap 30.

In various embodiments, including the embodiment shown in FIGS. 3A and 3B, two or more, such as all of the flow channels, or portions thereof, e.g., porous solid support chambers, have a different cross-sectional diameter. For example, solid support chamber 46a has a narrower diameter than solid support chamber 46c. In some versions, none of the flow channels, or portions thereof, e.g., porous solid support chambers, have the same cross-sectional diameter. In other embodiments, two or more of a plurality of flow channels, or portions thereof, e.g., porous solid support chambers, have the same cross-sectional diameter. As with the flow channel, preferably, the solid support chamber is not concentric with the rotational axis of the rotor.

A zoomed-in view of a portion of a rotor is provided in FIG. 3B. The rotor includes a flow channel 46b. Optionally, the flow channel also includes a flow channel spacer 49 for spacing a porous solid support from a surface, e.g., a bottom surface, of a porous solid support chamber. In various embodiments, a flow channel spacer can be crescent shaped and extend in an arcuate manner along its length. The flow channel spacer can facilitate fluid flow through the outlet by preventing the porous solid support, e.g., beads or fibers, from physically blocking the exit from the solid support chamber.

The solid support chamber 46 is configured to hold one or more porous solid supports 45. Porous solid supports can be configured to capture and thereby concentrate analyte, e.g., concentrate analyte from a first concentration to a second concentration, from a sample flowed therethrough by an amount of analyte concentration, such as 1000× or more in any of the time amounts described herein, such as in 30 min or less, such as 1 hour or less. In various embodiments, a porous solid support is bounded, such as bounded at an upstream face and/or a downstream face by a frit.

In some aspects, a porous solid support can be a selective membrane or a selective matrix. As used herein, the terms "selective membrane" or "selective matrix" as referred to herein is a membrane or matrix which retains one substance, e.g., an analyte, more effectively, e.g., substantially more effectively, than another substance, e.g., a liquid, such as portions of a sample other than the analyte and/or water and/or buffer, when the substances are exposed to the porous solid support and at least one of them is moved at least partially therethrough. For example, a porous solid support, such as a selective matrix, having a biological sample flowed therethrough can retain an analyte, e.g., nucleic acids, while the remainder of the sample passes through the porous solid support.

Examples of porous solid supports include, but are not limited to: alumina, silica, celite, ceramics, metal oxides, porous glass, controlled pore glass, carbohydrate polymers, polysaccharides, agarose, Sepharose™, Sephadex™, dextran, cellulose, starch, chitin, zeolites, synthetic polymers, polyvinyl ether, polyethylene, polypropylene, polystyrene, nylons, polyacrylates, polymethacrylates, polyacrylamides, polymaleic anhydride, membranes, hollow fibers and fibers, or any combinations thereof. The choice of matrix material is based on such considerations as the chemical nature of the affinity ligand pair, how readily the matrix can be adapted for the desired specific binding.

In some embodiments, a porous solid support is a polymeric solid support and includes a polymer selected from polyvinylether, polyvinylalcohol, polymethacrylate, polyacrylate, polystyrene, polyacrylamide, polymethacrylamide, polycarbonate, or any combinations thereof. In one embodiment, the solid support is a glass-fiber based solid support and includes glass fibers that optionally can be funcationalized. In some embodiments, the solid support is a gel and/or matrix. In some embodiments, the solid support is in bead, particle or nanoparticle form.

In various aspects, porous solid supports include a plurality of magnetic beads. Such beads can be of a size such that the beads are retained in a flow channel during a loading step wherein a sample is flowed into a flow channel and/or porous solid support. The beads can also be retained in the flow channel during a washing step when a buffer is flowed through the channel and/or the porous solid support. The beads also can be of a size and/or magnetic content such that they can be released from a flow channel during an elution step. Such a release can be made by changing or removing a magnetic field in which the beads are held in the channel. In an elution step, the beads can flow out of the rotor and/or into a stator for a subsequent elution.

A myriad of functional groups can be employed with the subject embodiments to facilitate attachment of a sample analyte or ligand to a porous solid support. Non-limiting examples of such functional groups which can be on the porous solid support include: amine, thiol, furan, maleimide, epoxy, aldehyde, alkene, alkyne, azide, azlactone, carboxyl, activated esters, triazine, and sulfonyl chloride. In one embodiment, an amine group is used as a functional group. A porous solid support can also be modified and/or activated to include one or more of the functional groups provided that facilitate immobilization of a suitable ligand or ligands to the support.

In some embodiments, a porous solid support has a surface which includes a reactive chemical group that is capable of reacting with a surface modifying agent which attaches a surface moiety, such as a surface moiety of an analyte or ligand of a sample, to the solid support. A surface modifying agent can be applied to attach the surface moiety to the solid support. Any surface modifying agent that can attach the desired surface moiety to the solid support may be used in the practice of the present invention. A discussion of the reaction of a surface modifying agent with a solid support is provided in: "An Introduction to Modern Liquid Chromatography," L. R. Snyder and Kirkland, J. J., Chapter 7, John Wiley and Sons, New York, N.Y. (1979), the entire disclosure of which is incorporated herein by reference for all purposes. The reaction of a surface modifying agent with a porous solid support is described in "Porous Silica," K. K. Unger, page 108, Elsevier Scientific Publishing Co., New York, N.Y. (1979), the entire disclosure of which is incorporated herein by reference for all purposes. A description of the reaction of a surface modifying agent with a variety of solid support materials is provided in "Chemistry and Technology of Silicones," W. Noll, Academic Press, New York, N.Y. (1968), the entire disclosure of which is incorporated herein by reference for all purposes.

In some implementations, the rotor comprises a cap at the outer face of the rotor. In some aspects, the cap is integrated with the rotor main body and as such, is composed of the same single integrated piece of material or materials as the main body. In other versions, the cap itself is an integrated plastic body that is operably couplable to the main body. In some implementations, the cap 30 is operably connected to the main body of the rotor and one wall of the flow channel is defined by the cap In some versions, e.g. as illustrated in FIG. 4, the cap 30 includes a film such as a polymeric, e.g., plastic, and/or metallic film, e.g., foil. The film optionally can comprise openings 38 to permit access of a spline to the propulsion engagement openings in the rotor. Alternatively, the film can be puncturable by a spline of other implement.

In other versions, e.g. as illustrated in the inset of FIG. 5B, the cap 30 comprises an integrated plastic body. The cap of FIGS. 5A and 5B include a plurality of openings (i.e., cutouts) 38 to permit access of a propulsion element to the propulsion engagement openings of the rotor. In some implementations, the cap 30 also includes a central opening 36 for receiving one or more portions of a stator therein, such as a central stator protrusion around which the rotor can rotate. In a preferred embodiment, the portion of the cap, the flow channel surface 34, forms a wall of the flow channel or a portion thereof, e.g. the solid support chamber. In such versions, the cap 30 further can include a plurality of flow channel mating elements 32 for operably connecting the cap with the flow channel. The flow channel mating elements can be a structure that engages with the flow channel and relies on friction to hold the cap in place. In another, preferred embodiment, the flow channel mating element can be welded to the main rotor body or incorporate an adhesive element to provide for a strong bond between main rotor body and cap structure and to prevent leakage of the flow channel when the valve is operational. In some versions, a cap is removably couplable and/or adhesively attached to a main body such that it can be removed and/or replaced by another cap.

Stator

The stator is an integral part of every rotary valve described herein. The stator usable in the devices and methods described herein include a first face, e.g., a stator face. The stator face is planar or has a planar portion. In an assembled valve, the stator face is perpendicular or substantially perpendicular to the rotational axis of the rotor and substantially complementary to valving face of the rotor. The stator face optionally comprises a gasket 80 to facilitate a fluid-tight seal at the rotor-stator interface. The stator can have additional faces, for example an anchoring face that defines a second surface of the stator.

One embodiment of a stator of a rotary valve for use in practicing the subject methods is provided in FIG. 6. In various embodiments, the stator includes a stator face 52 and a plurality of passages, each passage including a port 53, e.g., an opening configured for passing fluid therethrough, at the stator face 52. The plurality of passages can range from 2 to 80, such as 2 to 36, such as 4 to 18. A port can be defined by edges of an opening in the stator face, such as a circular or rectangular opening. A port can have any of the dimensions, such as the cross-sectional diameter of any of the passages, e.g., microfluidic passages provided herein.

In one implementation, the stator ports are distributed radially around the center of the stator face. In a preferred implementation, the two or more stator ports are located at a first distance from the rotational axis of the rotor, when assembled as a rotary valve, and an additional two or more stator ports are located at a second, different, distance from the rotational axis. In some implementations, there are an equal number of stator ports at the first distance and at the second distance. Alternatively, there may be more or fewer stator ports located at a first distance and at a second distance from the rotational axis. FIG. 4 illustrates the certain features of the stator in the context of an assembled rotary valve. In particular, the cross-sectional view illustrates two stator ports at varying distances from the rotational axis. The first port 53a is farther from the axis and aligns with the inlet 41 of the flow channel in the rotor. The second port 53b is closer to the axis and aligns with the outlet 42 of the flow channel. In other configurations, stator ports at different distances from the rotational axis can interact with fluid handling features, such a connector or fluidic selectors. One of skill in the art will appreciate that additional stator ports can be located at a third, fourth, et seq distance from the rotational axis.

Each passage 54 in the stator comprises at least two termini, one at a stator valve face and the second terminating at an orifice to another structure (for e.g., a sample holding chamber, a lysis chamber or an outlet to the environment) or also emerging at the stator valve face. In certain implementations, the second termini can comprise a frangible seal that initially resists flow through the passage but can be ruptured during operation of the device to permit flow through the passage. In a preferred implementation, the passage is a microfluidic feature having a smallest dimension of 750 µm or less. In other implementations, the smallest dimension can be 600 µm or less, 500 µm or less, 400 µm or less, 200 µm or less, or 100 µm or less. The passage can comprise any cross-sectional shape, preferably rectangular. In some implementations, each passage, excluding the termini, is entirely embedded within the stator main body. In other implementations, at least one passage extends through the stator main body to an anchoring face, and then extends as an exposed conduit along the anchoring face of the stator. Such exposed passages may terminate on the anchoring face or, alternatively, may pass through the stator to an orifice at a structural feature such as a chamber, well or tubing connector.

Rotor-Stator interface

In the subject embodiments, the rotor contacts the stator at an interface to form a fluid-tight seal. In such embodiments, the fluid-tight seal entirely or substantially prevents a fluid from leaking out via the interface during device operation. Such a fluid can be a sample, buffer, or other fluid flowed through the device components including the rotor and the stator according to the subject embodiments. The fluid-tight seal is maintained as the rotor is rotated with respect to and slides along the stator.

According to various embodiments, the valves include a retention element biasing the stator and the rotor together. A retention element can include a retention ring and/or a biasing element. The retention element (1) holds the rotor and stator in proximity to one another and (2) biases these two elements together to form a leak-tight interface. In some implementations, a single structure both mains proximity and provides a biasing force. In other implementations, a first structure, e.g., a retention ring, aligns the rotor and stator and a second structure, e.g. a biasing element, presses the rotor and stator together.

A retention element can be mobile or stationary relative to the stator. For example, the propulsion element, in addition to spinning the rotor, can push the rotor into the stator to form a leak-tight interface. In a preferred embodiment, at least a portion of the retention element is stationary relative to the stator. In one embodiment, the retention element comprises a retention ring and a biasing element, wherein the retention ring is fixedly coupled to the stator such that the rotor is held between the retention ring and the stator. In some implementation, the retention ring provides sufficient force to form a leak-tight seal between the rotor and stator.

In other implementations, the retention element comprises a retention ring 91 and separate a biasing element 96. The retention ring is coupled to a stator, e.g., via one or more coupling protrusions 57 on the stator and corresponding retention ring attachment element 94 (see, e.g. FIG. 1A). By such coupling, the retention ring can be configured to be fixed in a position while a rotor rotates with respect to it and the stator. The retention ring can be coupled to the stator by any method known in the art, e.g., by heat staking or ultrasonic welding the coupling protrusions or using a standard retainer, such as a push nut 98 (see e.g., FIG. 8A and 8B).

Retention rings are configured to provide a stationary base for the biasing element such that the biasing force can act to maintain the rotor in contact with the stator. In one implementation, the retention ring comprises a face such as a planar and/or annular lip 93 for contacting a biasing element 96 such as a spring. Such a face can be in a plane parallel with that of an outer face and/or a valving face and/or a stator face. Similarly, the biasing element will typically engage the rotor along a face such as a planar and/or annular lip 21 on the rotor. The planar lip can be a peripheral protrusion on the rotor, i.e. a peripheral lip 22, (see, e.g. FIG. 3A and FIG. 8B). In some embodiments, the planar face can be formed more centrally, such as the interior lip 23 illustrated in FIG. 8B.

A retention ring can also include a spline access opening, which can be a circular opening opposite a stator. A spline access opening can be configured to receive a portion of a rotation propulsion element, e.g., spline, therethrough while the spline engages the rotor to rotate the rotor.

A biasing element can be shaped as a ring positioned around at least a portion of a rotor. A basing element can also be substantially circular, e.g., ring-shaped, and/or cylindrical and/or can have a central axis which is or is not concentric with a rotational axis of a rotor. Preferably, the biasing element provides a substantially symmetrical force relative to the rotational axis so as to bias the rotor uniformly against the stator without canting.

A biasing element can be one or more springs. In an embodiment in which the biasing element is a spring, the spring can be a compression spring or a tension spring made of metal, plastic or other polymer. In various embodiments, a biasing element is a ribbon spring, such as a ring-shaped ribbon spring. In various embodiments, a biasing element is a wave spring, such as a ring-shaped wave spring. A biasing element can also be shaped as a cylindrical column and can be contained within, e.g., between two portions of, a rotor and/or a stator and/or a retention element.

A biasing element can be a mass of an elastic material such as rubber or foam in the shape of a block, cylinder, ring, sphere, or other shape. The biasing element can be in the form of one or more bands of rubber. The biasing element can be in the form of a piece or pieces of metal, plastic or other polymer that are shaped to exert sufficient force against other device components. Such a shaped piece of metal can include a metal band that arcs within for example, the rotating ring. The biasing element can be in the form of a magnet or series of magnets configured to repel or attract each other and thereby assert sufficient force against the device components. The biasing element can be made out of the same material as any of the other valve components, e.g., a gasket. In some embodiments, the biasing mechanism can be a part of, such as integral with, another component, such as a rotor and/or retention ring and/or stator. As used herein, by "integral" and "integrated with" is meant composed of a single piece of integrated material or materials.

Gasket

In some aspects, a rotary valve includes a gasket between the stator face and the rotor valving face. A gasket is a mechanical seal that fills a space between two or more mating surfaces of objects, generally to prevent leakage from or into the joined objects while the gasket is under compression. In various aspects, the gasket is composed, e.g., entirely composed, of an elastic and/or compressible material. In some versions, the rotor comprises the gasket and in other versions, the stator comprises the gasket. In embodiments wherein the rotor comprises a gasket, is fixedly, e.g., adhesively, attached to a rotor and forms a sliding interface along the stator. Also, in those embodiments where the stator comprises the gasket, the gasket is fixedly, e.g., adhesively, attached to a stator and forms a sliding interface along the rotor.

One embodiment of a valve device component is shown in FIGS. 7A and 7B. Specifically, FIGS. 7A and 7B illustrate a gasket 80 slidably engaging a stator. The gasket 80 also includes a first aperture 84 aligned with the inlet 41 of the rotor's flow channel, and a second aperture 85 aligned with the outlet 42.

In various aspects, a gasket is substantially cylindrical and/or disk-shaped wherein the distance between the axis of rotation and the outer circumference of the gasket is greater than the distance between the axis of rotation to the most distant port on the stator. In some embodiments, such as illustrated in FIGS. 7A and 7B, the gasket is annular having an outer circumference beyond the most distant stator port as described above and wherein the distance between the axis of rotation and inner circumference of the annulus is less than the distance between the axis and the most proximal stator port. A gasket can have an outer cross-sectional diameter such as any of the rotor diameters provided herein. A gasket can have an outer cross-sectional diameter, for example, of 100 mm or less, such as 45 mm or less, such as 50 mm or less, such as 40 mm or less, such as 20 mm or less, such as 10 mm or less. The inner and outer gasket diameters can range, for example, from to 1 mm to 100 mm, 3 mm to 50 mm, 3 mm to 25 mm or 5 mm to 35 mm. A gasket can also have a thickness such as any of the thicknesses of device components provided herein, such as 10 mm or less, such as 5 mm or less, such as 1 mm or less or 1 mm or more, 5 mm or more, or 10 mm or more.

In various aspects, a gasket is composed, e.g., entirely composed, of one or more polymeric materials (e.g., materials having one or more polymers including, for example, plastic and/or rubber and/or foam). A gasket can also be composed of a silicone material. A gasket can be composed of any of the elastic materials provided herein. Gasket materials of interest include, but are not limited to: polymeric materials, e.g., plastics and/or rubbers, such as polytetrafluoroethene or polytetrafluoroethylene (PTFE), including expanded polytetrafluoroethylene (e-PTFE), polyester (Dacron™), nylon, polypropylene, polyethylene, polyurethane, etc., or any combinations thereof. In some embodiments, the gasket comprises Neoprene (polychloroprene), a polysiloxane, a polydimethylsiloxane, a fluoropolymer elastomer (e.g. VITON™), a polyurethane, a thermoplastic vulcanizate (TPV, such as Santoprene™), butyl, or a styrenic block copolymer (TES/SEBS).

According to some embodiments, a gasket includes one or more apertures fully penetrating the thickness of the gasket. In those implementations, wherein the gasket is affixed to the stator, the gasket comprises an aperture corresponding to and aligned with each stator port, to permit fluid flow therethrough. In implementations wherein the gasket is affixed to the rotor, the gasket comprises an aperture corresponding to and aligned with each of the flow channel inlet and outlet, if present, to permit flow across the rotor-stator interface.

When fluids are forced through the apertures of the gasket, the pressures mobilizing the fluid can distort the inherently elastic material of the gasket. To minimize such distortion, which can lead to leaking at the rotor-stator interface, some versions of the stator include one or more arcing rails, such as a first and a second arcing rail, for laterally engaging the gasket to inhibit distortion of the gasket when one or more fluid handling elements, such as grooves or apertures, of the gasket are pressurized. By laterally engaging is meant contacting another element and exerting a force thereon in a direction substantially radially outward and/or inward with respect to a rotational axis of a rotor and/or within a plane concentric with the rotational axis of a rotor and having the same thickness as the axis. Laterally engaging can also refer to contacting another element and exerting a force thereon in a direction substantially perpendicular to the rotational axis of a rotor.

In various embodiments, one or both of the arcing rails are ring-shaped and can be concentric with the rotational axis. In various embodiments, arcing rails are circular and a first arcing rail has a diameter that is smaller than a second arcing rail. In one embodiment, the stator 50 comprises two arcing rails, wherein a proximal rail 71 is proximal of the passage and constrains the gasket from distorting toward the rotational axis and wherein a distal rail 72 is distal of the passage and constrains the gasket from distorting away from the rotational axis. In implementation having two arcing rails, the rails preferably are located to bracket the fluidic features of the gasket. For example, FIG. 6 illustrates a stator having two arcing rails. One rail, the proximal rail 71, is located closer to the rotational axis than the gasket aperture that engages the stator port. The second rail, the distal rail 72, is located further from the rotations axis that the more distal gasket aperture that engages a stator port. In an alternative implementation, the gasket is affixed to the stator and the arcing rails are integrated into the rotor.

Pressurizing can include increasing the pressure in the one or more ports from a first pressure, e.g., one atmosphere or substantially one atmosphere, to a second pressure greater than the first. The second pressure can be more than one atmosphere, such 1.2 atm or more, 1.5 atm, or more 2 atm or more, or 5 atm or more. The pressurizing can include laterally engaging, such as by contacting, at least one of the arcing rails and at least one of the gaskets to form a fluid-tight seal between the arcing rail and the gasket. Laterally engaging can include moving at least a portion of a gasket, e.g., a protruding ring, toward the arcing rail which it laterally engages. When a fluid-tight seal is formed, no liquid or substantially no liquid leaks across the seal throughout device operation. Also, in some versions, the stator further includes a second arcing rail concentric with a first arcing rail. In such embodiments, pressurizing the port includes laterally engaging the second arcing rail and the gasket to form a fluid-tight seal therebetween.

Fluid Handling

The rotary valves described herein are useful for directing fluid flows within a device, especially a microfluidic device. As such, the rotary valves comprise at least one fluid handling feature. In some embodiments, the fluid handling feature is comprised within the rotor valving face. In implementations wherein the rotor comprises a gasket, one or more fluid handling features can be comprised with the gasket.

As used herein, a fluid handling feature is a physical structure in the rotor or gasket that, when aligned with two stator ports, fluidically connect the two ports and associated passages to form a continuous fluidic path. In some embodiments, the fluid handling feature is a fluidic connector 86. A fluidic connector is configured to fluidically connect a first stator port to a second stator port. In implementations, such as illustrated in FIGS. 7A and 7B, the fluidic connector is an elongated groove in the rotor or gasket with the longest dimension along a line radiating from the center of the rotor. Such a radially aligned fluidic connector is capable of sequentially connecting a plurality of pairs of stator ports, such as illustrated in FIG. 6, wherein each of the plurality of pairs has one proximal port and one distal port, wherein all proximal ports are one distance from the rotational axis and all distal ports are a second, larger, distance from the axis. In some embodiments, the fluid handling feature is a flow channel, wherein when the flow channel inlet is aligned with one stator port and the flow channel outlet is aligned with a second stator port, the full volume of the flow channel fluidically connects the two stator ports. Accordingly, the flow channel can act as a fluidic connector. In some embodiments, the fluid handling feature is a fluidic selector 77 having a first portion that is an arc with all points along the first portion being equidistant from the rotational axis, and a second portion extending radially toward or away from the center of the rotor.

One aspect of the invention provides a rotary valve having a rotor wherein the rotor valving face comprises a first fluidic connector, wherein in a first rotor position a first port of the stator is fluidically connected to a second port of the stator via the first connector. In a second rotor position, a third port is fluidically connected to a fourth port via the first fluidic connector. Optionally, in a third rotor position, a fifth port is fluidically connected to a sixth port via the first fluidic connector. In one implementation, the fluidic connector is an elongate groove. In another implementation, the fluidic connector is a flow channel in the rotor.

One aspect of the invention provides methods of purifying an analyte, the method comprising (1) providing a rotary valve comprising a stator 50 comprising a stator face 52 and a plurality of passages 54, each passage comprising a port 53 at the stator face; (b) a rotor 10 operably connected to the stator and comprising a rotational axis 16, a rotor valving face 12, and a flow channel 40 having an inlet 41 and an outlet 42 at the rotor valving face, wherein the flow channel comprises a porous solid support 45; and (c) a retention element 90 biasing the stator and the rotor together at a rotor-stator interface to form a fluid tight seal; and (2) flowing a sample comprising analyte through the flow channel and retaining at least a portion of the analyte on the porous solid support to produce a bound analyte portion and a depleted sample portion. In some implementations, the method further comprises rotating the rotor about the rotational axis to a first position and thereby fluidically connecting the first port, the flow channel, and the second port. In this first position, the sample flows into the flow channel via the first port and the depleted sample portion exits the flow channel via the second port. In a further implementation, the stator comprises four ports and the method further comprises rotating the rotor to a second position and thereby fluidically connecting a third port, the flow channel and a fourth port. In this second position, an eluent flows into the flow channel via the third port, thereby removing at least a portion of the analyte from the porous solid support to produce an analyte sample, which exits the flow channel via the fourth port. As used herein, the term "eluent" refers to a solvent used in order to effect separation of an analyte from solid support by elution.

In some versions, the disclosed valve devices are fluidic sample handling devices and/or sample processing devices which can be biological assay devices, such as biological assay sample preparation or processing devices. As used herein, a "biological assay" is test on a biological sample that is performed to evaluate one or more characteristics of the sample. A biological sample is a sample containing a quantity of organic material, e.g., one or more organic molecules, such as one or more nucleic acids e.g., DNA and/or RNA or portions thereof, that can be taken from a subject. A biological sample can include one or more of blood, urine, mucus, or other body fluid. Accordingly, biological assay sample preparation devices, according to some embodiments, are devices that prepare a biological sample for analysis with a biological assay. Also in some aspects, a biological sample is a nucleic acid amplification sample, which is a sample including one or more nucleic acids or portions thereof that can be amplified according to the subject embodiments.

Method of Manufacture

One aspect provides methods of producing a rotary valve, the method comprising: (a) forming a stator 50 comprising a stator face 52 from a stator body material; (b) forming within the stator a plurality of passages 54, each passage comprising a port 53 at the stator face; (c) forming a rotor 10 comprising a rotor valving face 12 from a rotor body material; (d) forming within the rotor a flow channel 40 comprising an inlet 41 and an outlet 42 at the rotor valving face; and (e) inserting a porous solid support 45 into the flow channel. In some implementations, the method further comprises operably connecting the stator and the rotor so that the rotor is configured to rotate about a rotational axis.

Each of the components of the subject devices or aspects thereof, such as stators, rotors, gaskets, displaceable spacers, biasing elements, retention rings, caps, and/or cams, can be composed of a variety of materials, such as a single material, or a plurality of materials, such as two, three, four, five, or ten or more materials. Such components can, in various aspects, also include one or more rigid materials, such as a polymeric material, such as plastic. Such components can, in some aspects, include one or more flexible materials, such as a layer of flexible material coating a core composed of one or more rigid materials. Such components can, in various aspects, include one or more elastic materials. Elastic materials are materials that are flexible and also biased to remain in their initial shape when force is exerted thereon. For example, a gasket can be composed, such as composed entirely, of an elastic material.

Components of the subject devices can also include one or more polymeric materials (e.g., materials having one or more polymers including, for example, plastic and/or rubber and/or foam) and/or metallic materials. Such materials can have characteristics of flexibility and/or high strength (e.g., able to withstand significant force, such as a force exerted on it by use, without breaking and/or resistant to wear) and/or high fatigue resistance (e.g., able to retain its physical properties for long periods of time regardless of the amount of use or environment).

According to the subject embodiments, the components of the subject devices, can each be composed of a variety of materials and can be composed of the same or different materials. Materials that any of the device components described herein can be composed of include, but are not limited to: polymeric materials, e.g., photopolymer materials such as TangoPlus™, and Veroclear™, and/or plastics, such as polytetrafluoroethene or polytetrafluoroethylene (PFTE), including expanded polytetrafluoroethylene (e-PFTE), polyester (Dacron™), polypropylene, nylon, polyethylene, high-density polyethylene (HDPE), polyurethane, etc., metals and metal alloys, e.g., chromium, titanium, stainless steel, etc., and the like. In various embodiments, such materials can be or include one or more thermoplastic materials. Such materials can include acrylonitrile butadiene styrene (ABS), acrylic, such as poly (methyl methacrylate) (PMMA), polyoxymethylene (POM), also known as acetal, polyacetal and polyformaldehyde, aliphatic or semi-aromatic polyamide (PA), polyethylene (PE), polypropylene (PP), polyetheretherketone (PEEK), cyclic olefin copolymer (COC), cyclic olefin polymer (COP), polycarbonate (PC), and blends thereof.

The materials can be transparent or semi-transparent such that a device user can observe a sample and/or a solution throughout device operation, such as during mixing or sample processing. By utilizing translucent materials, fluids are visible as they are transported among one or more chambers of the device, providing visual feedback during device operation. Alternatively, some or all of the materials can be opaque such that a device user can observe the sample while minimizing contaminating background light.

Materials of the devices according to the subject embodiments can be materials that are effectively injection-molded. Materials employed according to the subject embodiments can also be materials that are effectively printed, such as by melting and dispensing in an ordered manner, using a 3D printer. For example, all parts can be designed according to the subject embodiments using 3D CAD software (SOLID-WORKS) and fabricated using an Objet 260 multi-material 3D printer (STRATASYS, Eden Prairie, Minn., USA).

In some implementations, forming the stator from the stator body material comprises performing injection molding of the stator body material. In some implementations, forming the stator from the stator body material comprises embossing, reaction molding, or thermoforming the stator body material. In some implementations, forming the stator from the stator body material comprises 3-dimensionally (3D) printing the stator. Forming the plurality of passages can comprise performing etching or computer numeric control (CNC) machining of the stator body material In some implementations, forming the rotor from the rotor body material comprises performing injection molding of the rotor body material. In some implementations, forming the rotor from the rotor body material comprises embossing, reaction molding, or thermoforming the stator body material. In some implementations, forming the rotor from the rotor body material comprises 3-dimensionally (3D) printing the rotor. Forming the flow channel comprises performing etching or computer numeric control (CNC) machining of the rotor body material As noted above, methods of fabricating, such as by manufacturing, the subject devices are provided herein. In some versions, one or more components of the devices are fabricated using a manufacturing method such as injection molding of one or more materials, e.g., plastics. The materials, e.g., plastics, can include at least one regular plastic, such as, but not limited to acrylonitrile butadiene styrene (ABS), acrylic, polyoxymethylene (POM), aliphatic or semi-aromatic polyamide (PA), polyethylene (PE), polypropylene (PP), polyetheretherketone (PEEK), polycarbonate (PC), cyclic olefin polymers, cyclic olefin copolymers or any of the other materials provided herein.

In some embodiments, the methods include forming a device component body, such as a stator body, a rotor body or a gasket body. A device component body is a portion of a device composed of a single integrated uniform material or combination of materials, or a portion thereof from a first, e.g., body, material. Forming a component body or a portion thereof can be performed by reaction molding, injection molding, embossing, etching, blow molding, rotational molding, thermoforming and/or machining, e.g., computer numeric control (CNC) machining.

The subject methods also can include forming one or more features, e.g., microfluidic features, in a component. Microfluidic features can be formed in a component body using any of the same methods used in forming a body. For example, microfluidic features can be formed by performing embossing, injection molding, reaction molding, etching, blow molding, rotational molding, thermoforming and/or machining, e.g., computer numeric control (CNC) machining, or any combination thereof. When microfluidic features are formed by injection molding, a container providing a mold includes one or more reciprocal microfluidic features around which a molten body material forms. When the molten material becomes solid, the features remain defined in the resulting body.

In various embodiments, the methods include operably connecting valve device components, such as the stator, rotor, gasket, and/or porous solid support, for device operation and/or storage and/or transport. In some versions, the methods include operably connecting the stator and the rotor so that the rotor is configured to rotate about a rotational axis. Such operable connection can include inserting the rotor into a rotor-receiving cavity of the stator. In some aspects, the methods include operably connecting the gasket and the rotor by adhesively attaching them or by press-fitting or contact-fitting them together. The methods can also include operably connecting the gasket and the stator by adhesively attaching them or by press-fitting or contact-fitting them together.

Making it Shippable

In some versions of the rotary valve, in addition to a rotor, stator and retention element, the valve includes a gasket between the stator face and the rotor valving face, and a structure for maintaining the valve in a storage configuration wherein the rotor and stator are spaced apart such that the gasket is not compressed at the rotor-stator interface. Gaskets, typically formed of compressible, elastomeric materials, are susceptible to compression-set and adhesion to adjacent surfaces if stored under compression for extended periods of time. Accordingly, described herein is a preferred implementation of a rotary valve that includes a displaceable spacer for preventing the gasket from sealing against at least one of the rotor and stator, wherein when the spacer is displaced, the gasket seals the rotor and stator together in a fluid-tight manner. In such a storage configuration, the gasket is not deformed by force exerted thereon and thus not subject to permanent deformation or undesired adhesions to the rotor or stator, which could affect the valve's effectiveness.

One aspect of the invention provides a rotary valve comprising (a) a rotor 10 comprising a rotor valving face 12 and a rotational axis 16; (b) a stator 50; (c) a gasket 80 interposed between the stator and the rotor valving face; and (d) a displaceable spacer 60 for preventing the gasket from sealing against at least one of the rotor and stator, wherein, when the spacer is displaced the gasket is configured to facilitate a fluid-tight interface between the rotor and stator. In certain implementations, the valve further comprises a retention element 90 biasing the rotor and stator towards one another.

Displaceable spacers according to the subject embodiments are aspects configured for preventing the gasket from sealing against at least one of the rotor and the stator. When the spacers are displaced, e.g., displaced from a pre-activated configuration to an activated configuration, the gasket seals the rotor and stator together in a fluid-tight manner. According to the subject embodiments, displaceable spacers can be part of and/or integral with a stator or rotor.

In one implementation, in the storage configuration, a displaceable spacer comprises a plurality of tabs that contact a lip on the rotor to hold the rotor away from the stator. Each of the plurality of tabs is displaceable to disengage from the lip in the operational configuration. In one embodiment, the displaceable spacer 60 comprises a plurality of tabs displaceable from a first tab configuration to a second tab configuration. FIGS. 8A and 8B illustrate one embodiment of a valve in a storage position. The stator comprises a plurality of tabs. In this embodiment, the stator comprises a plurality of tabs 61. In this implementation, a subset of the plurality of tabs is arranged around the periphery of the rotor-stator interface, i.e., peripheral tabs 62. The remaining tabs are placed to interface inward of the end of the rotor, i.e., interior tabs 63. The displaceable spacer can comprise peripheral tabs, interior tabs or a combination of both interior and peripheral tabs.

Displaceable spacers, such as tabs, can be shaped substantially as a three-dimensional box or rectangular shape. Each of the spacers, such as tabs, can include a planar face for reciprocally contacting a lip of a rotor as provided herein, in a pre-activated configuration. Such a planar face can be perpendicular to a plane defined by the stator face and/or the rotor valving face. Such a planar face can be configured to exert a force on a rotor lip in a direction parallel or substantially parallel with the rotational axis of the rotor.

Displaceable spacers can be composed of any of the same materials as stators, rotors, or other device components provided herein. For example, in various embodiments, displaceable spacers are composed of a polymeric material such as plastic and can be integral with a stator body. As such, in some instances, a stator can include a main body and one or more displaceable spacers operably coupled thereto and/or integral therewith.

In various aspects, a rotor suitable for use in the storable rotary valve comprises at least one lip 21 to interact with a plurality of tabs 61 displaceable from a storage configuration to an operational configuration, wherein each of the tabs 61 contact the at least one lip 21 and thereby prevent the gasket from sealing the rotor and stator in the storage configuration, and disengage with the at least one lip when the tabs are displaced from the storage configuration to the operational configuration. In one implementation, the rotor includes a curved outer wall including at least one lip. Such a peripheral lip 22 is configured to engage with a plurality of peripheral tabs. In some implementations, e.g., as illustrated in FIGS. 8B and 9B, the rotor can comprise a lip located within the body of the rotor, i.e. an interior lip 23, and the rotor further comprises a displacer slot 28 adjacent to the interior lip for each of the plurality of tabs 63, which is a negative space within the body of the rotor capable of accommodating the tabs when displaced to the operational configuration.

According to various embodiments, each of the tabs contact the at least one lip and thereby prevent the gasket from sealing the rotor and stator in the first tab configuration, and disengage with the at least one lip when the tabs are displaced from the first tab configuration to the second tab configuration. In the second tab configuration, the gasket seals against the rotor and/or stator in a fluid-tight manner.

To facilitate displacement of the spacer when transitioning from a storage configuration to an operational configuration, the rotor can comprise one or more cams 24 adjacent to a lip that interacts with the displaceable spacer. Each of the cams can be a ramp that upon rotation acts to displace the spacer. For implementations wherein the stator comprises a plurality of peripheral tabs, each of the cams has a length and progressively slopes along its length from a first radial distance from the rotational axis of the rotor to a second radial distance greater than the first radial distance. As such, each of the cams can be a ramp which progressively slopes radially outward, for example, from a rotational axis of a rotor, along the circumference of the rotor or a portion thereof. In such embodiments, the one or more cams exert a force in an outward or substantially outward direction, such as a direction away from a rotational axis of a rotor, on the displaceable spacers, e.g., plurality of tabs when the rotor is rotated. Typically the second radial distance is equal to or beyond the distance of a furthest edge of the lip from the main body of the rotor. One embodiment of the rotor is illustrated in FIGS. 2B and 2C, wherein the cam has a length that slopes from a distance interior of the outer edge of the lip to a distance even with the edge of the peripheral lip.

For implementations wherein the stator comprises a plurality of interior tabs, each of the cams has a length and progressively slopes along its length from a first radial distance from the rotational axis of the rotor to a second radial distance less than the first radial distance. In various aspects, the one or more cams exert a force in an inward or substantially inward direction, such as a direction toward a rotational axis of a rotor, on the displaceable spacers, e.g., plurality of tabs, and thereby actuate the displaceable spacers when the rotor is rotated.

Upon rotation, the tab slides along the ramp of the cam, which thereby displaces the plurality of spacers 60 from a storage configuration to an operational configuration thereby disengaging the plurality of spacers 60 from the at least one lip 21. In one implementation, the plurality of tabs 61 are irreversibly disengaged from the at least one lip 21 when the rotor is rotated.

As indicated above, in various aspects, the subject valves are activatable from a pre-activated shipping or storage configuration to an activated operational configuration for receiving one or more fluids therein. FIGS. 8A and 8B depict a device in a storage configuration. FIGS. 9A and 9B depict the valve embodiment of FIG. 8A in an operational configuration. In the embodiment illustrated in FIGS. 8A, 8B, 9A and 9B, the stator comprises a plurality of peripheral tabs 62 and a plurality of interior tabs 63. The interior lip 22 of the rotor rests upon the interior tabs 62 and the peripheral lip 23 rests upon the peripheral tabs 63. Thus, in the storage configuration, the rotor is held away from the stator, such that the gasket is not compressed at the rotor-stator interface.

FIGS. 9A and 9B illustrate the rotary valve in an operational configuration. After rotation of the rotor and engagement of the tabs with the cams, as described above, the tabs have been deflected beyond the edge of the peripheral and interior lips. The retention element provides a biasing force, in the form of two wave springs 96. This biasing force presses the rotor towards the stator to generate a fluid tight seal at the rotor-stator interface.

In various embodiments, the one or more displaceable spacers, e.g., plurality of tabs, are irreversibly disengaged from the at least one lip when the rotor is rotated. In such embodiments, the rotor actuates toward the stator in a direction along the rotational axis when the displaceable spacers are displaced. However, the rotor is prevented from actuating in the opposite direction away from the stator by the biasing element. As such, once a valve device is activated as described herein, it is not reversibly un-activatable to again be maintained in a storage/shipping position by, for example, rotation a rotor, such as rotation a rotor in an opposite direction which it was rotated to activate the valve device. Accordingly, once a stator is sealed with the gasket and/or rotor in a fluid-tight manner, it does not unseal during device operation or subsequent use. Accordingly, a device is discarded after a use, such as by flowing one or more fluids such as liquids, such as a sample therethrough rather than re-stored or further shipped in a shipping position. As such, embodiments of valve devices disclosed herein are single-use devices, wherein single-use refers to a single period of use not interrupted by substantial storage, e.g., storage for 1 day or more, or 2, 5, 10, 20, or 50 days or more, 180 days or more, or 365 days or more and/or shipping of the device.

In various aspects, the subject valves transition from a from a pre-activated shipping or storage configuration to an activated configuration for device operation utilizing structures other than the tab embodiments illustrated in FIGS. 8A and 9A. In such embodiments, a rotor can be operably connected to a stator by a pin-and-track coupling. In such an attachment, the rotor includes one or more pin which moves in a track in the stator such that the rotor is held away from the stator in the storage position and then drops out of the track when the rotor is rotated. In another embodiment, the stator includes the one or more pin which moves in a track in the rotor while the rotor is rotated. A rotor can also be operably connected to a stator by a thread-and-groove coupling wherein the rotor includes one or more threads which mateably connect to one or more reciprocal grooves on the stator. Alternatively, the stator includes one or more threads which mateably connect to one or more reciprocal grooves on the rotor. In such implementations, the biasing element will facilitate the rotor disengaging from the pin-track or thread structure to form the fluid-tight seal and prevent re-transition of the valve to its storage configuration.

One aspect provides methods of storing a rotary valve, the method comprising: (a) placing the valve as described herein into a storage container; and (b) storing the valve for a period of time. In some implementations, storing the valve comprises maintaining the valve in a storage position wherein the gasket is spaced apart from at least one of the rotor and the stator. In some implementations, the rotor comprises the gasket and in the storage configuration the gasket is spaced apart from the stator. In some implementations, the stator comprises the gasket and in the storage configuration the gasket is spaced from the rotor. The methods can include placing a valve in a storage location, such as within a storage container and/or on a tray or shelf, and then storing the valve device for a period of time. A storage container can include, for example, a bag, a box, such as an open-top box, a plastic mold, or another component having a recess for receiving the valve or a portion thereof. A storage container can also be an intermodal container, which is a ship or train cargo-shipping container, or a room such as a room of a storage facility. A plurality of valves can be stored in the same container.

In various embodiments, the methods include storing, such as storing in a storage location, the valve device for a period of time. The period of time can range, for example, from 1 day to 2 years, such as 10 days to 1 year, such as 30 days to 300 days. The period of time can be 1 day or more, 30 days or more, 90 days or more, 180 days or more, 1 year or more, or 2 years or more. The period of time can also be 1 day or less, 30 days or less, 90 days or less, 180 days or less, 1 year or less, or 2 years or less. The period of time can range, for example, from 1 month to 24 months, such as 10 months to 20 months, such as 12 months to 18 months. The period of time can be 6 months or more, such as 9 months or more, such as 12 months or more. The period of time can also be 6 months or less, 9 months or less, 12 months or less, 15 months or less, 18 months or less, or 24 months or less. In such embodiments, the months are consecutive months.

| # | structure |
|---|---|
| 00 | rotary valve |
| 02 | rotor-stator interface |
| 04 | gasket-stator interface |
| 10 | rotor |
| 11 | rotor main body |
| 12 | rotor valving face |
| 13 | rotor outer face |
| 14 | rotor outer wall |
| 15 | rotor central opening (axle) |
| 16 | rotor rotational axis |
| 17 | propulsion engagement openings |
| 18 | compression limiter |
| 20 | displaceable spacer interface |
| 21 | lip |
| 22 | peripheral lip |
| 23 | interior lip |
| 24 | cam |
| 25 | interior cams |
| 26 | peripheral cam |
| 28 | displacer slots |
| 30 | rotor cap |
| 32 | rotor mating elements |
| 34 | cap f.c. surface |
| 36 | cap central opening |
| 38 | cap spline access |
| 40 | flow channel (f.c.) |
| 41 | f.c. inlet |
| 42 | f.c. outlet |
| 43 | $1^{st}$ conduit |
| 44 | $2^{nd}$ conduit |
| 45 | solid support (s.s.) |
| 46 | solid support chamber |
| 47 | entry to s.s. chamber |
| 48 | exit from s.s. chamber |
| 49 | f.c. spacer |
| 50 | stator |
| 51 | stator main body |
| 52 | stator face |
| 53 | stator port |
| 54 | passage |
| 55 | passage orifice |
| 56 | stator central protrusion (axle) |
| 57 | coupling protrusion (ret. elem post) |
| 60 | displaceable spacer |
| 61 | tab |
| 62 | peripheral tab |
| 63 | interior tab |
| 70 | arcing rail |
| 71 | proximal rail |
| 72 | distal rail |
| 80 | gasket |
| 81 | gasket (sealing) face |
| 82 | gasket protrusion/wall |
| 83 | gasket aperture |
| 84 | gasket inlet (see gasket port) |
| 85 | gasket outlet (see gasket port) |
| 86 | connector groove |
| 87 | selector groove |
| 90 | retention element |
| 91 | retention ring |
| 92 | retention ring body |
| 93 | retention ring lip |
| 94 | retention ring attachment elements |
| 96 | biasing element |
| 98 | retainer (push nut) |

The invention claimed is:

1. A rotary valve comprising:
   a. a rotor 10 comprising a rotor valving face 12, an outer face 13 opposite the rotor valving face, and a rotational axis 16;
   b. a stator 50;
   c. a gasket 80 interposed between the stator and the rotor valving face; and
   d. a displaceable spacer 60 for preventing the gasket from sealing against at least one of the rotor and stator, wherein, when the spacer is displaced the gasket seals the rotor and stator together in a fluid-tight manner.

2. The valve of claim 1, further comprising a retention element 90 biasing the rotor and stator towards one another.

3. The valve of claim 2, wherein the retention element 90 comprises a retention ring 91 and a biasing element 96.

4. The valve of claim 3, wherein the retention ring 91 is fixedly coupled to the stator and the biasing element 96 is a spring.

5. The valve of claim 1, wherein the rotor 10 comprises at least one lip 21 and the displaceable spacer 60 comprises a plurality of tabs 61 displaceable from a storage configuration to an operational configuration, wherein each of the tabs 61 contact the at least one lip 21 and thereby prevent the gasket from sealing the rotor and stator in the storage configuration, and disengage with the at least one lip when the tabs are displaced from the storage configuration to the operational configuration.

6. The valve of claim 5, wherein the at least one lip 21 is an interior lip 23 and the rotor further comprises a displacer slot 28 adjacent to the interior lip, wherein the displacer slot accommodates the tabs 63 when displaced to the operational configuration.

7. The valve of claim 5, wherein the rotor 10 comprises a curved outer wall 14 and the at least one lip 21 is a peripheral lip 22 located on the outer wall.

8. The valve of claim 5, wherein the rotor comprises one or more cams 24 which displace the plurality of tabs 61 from the storage configuration to the operational configuration and thereby disengages the plurality of tabs 61 from the at least one lip 21 when the rotor is rotated.

9. The valve of claim 1, wherein the gasket 80 comprises an aperture 83 therethrough and wherein the stator comprises an arcing rail 70 for laterally constraining the gasket.

10. The valve of claim 1, wherein the outer face 13 comprises an opening for engaging a spline.

11. The valve of claim 1, wherein the rotor further comprises a flow channel 40 having an inlet 41 and an outlet 42 at the rotor valving face, wherein the flow channel comprises a porous solid support 45.

12. The valve of claim 11, wherein the stator comprises a stator face 52 and a plurality of passages 54, each passage comprising a port 53 at the stator face.

13. A microfluidic network comprising (a) a rotary valve according to claim 12 and (b) a plurality of conduits 55 each fluidically connected to one of the ports 53.

14. A method of purifying an analyte, the method comprising:
 a. providing the valve according to claim 12;
 b. flowing a sample comprising analyte through the flow channel 40; and
 c. retaining at least a portion of the analyte on the porous solid support 45 to produce a bound analyte portion and a depleted sample portion.

15. The method of claim 14, wherein flowing the sample through the flow channel 40 further comprises rotating the rotor 10 at a first rotational position, thereby fluidically connecting a first port 53a, the flow channel 40, and a second port 53b.

16. The method of claim 15, wherein the sample is flowed into the flow channel 40 via the first port 53a to create a depleted sample and wherein the depleted sample exits the flow channel via the second port 53b.

17. The method of claim 15, further comprising rotating the rotor 10 to a second rotational position, thereby fluidically connecting a third port 53c, the flow channel 40 and a fourth port 53d.

18. The method of claim 17, further comprising flowing eluent into the flow channel 40 via the third port 53c and thereby releasing at least a portion of the analyte from the porous solid support 45 to produce an analyte sample, wherein the analyte sample exits the flow channel via the fourth port 53d.

19. A method of storing a rotary valve, the method comprising:
 a. placing the valve according to claim 1 into a storage container; and
 b. storing the valve for a period of time.

20. The method of claim 19, wherein storing the valve comprises maintaining the valve in a storage position wherein the gasket is spaced apart from at least one of the rotor and the stator.

* * * * *